(12) United States Patent
Wu et al.

(10) Patent No.: US 12,551,305 B1
(45) Date of Patent: Feb. 17, 2026

(54) CONTROL METHOD AND ASSOCIATED APPARATUS FOR SURGICAL ASSISTANCE SYSTEM

(71) Applicant: ROBOGENIX MEDICAL SINGAPORE PTE, LTD., Singapore (SG)

(72) Inventors: Gang Wu, Shanghai (CN); Cunwang Ge, Shanghai (CN); Hao Chen, Shanghai (CN); Qianlong Zhang, Shanghai (CN)

(73) Assignee: ROBOGENIX MEDICAL SINGAPORE PTE, LTD., Singapore (SG)

( * ) Notice: Subject to any disclaimer, the term of this patent is extended or adjusted under 35 U.S.C. 154(b) by 0 days.

(21) Appl. No.: 19/182,476

(22) Filed: Apr. 17, 2025

Related U.S. Application Data

(63) Continuation of application No. PCT/CN2024/112244, filed on Aug. 15, 2024.

(51) Int. Cl.
*A61B 34/37* (2016.01)
*A61B 17/00* (2006.01)
(Continued)

(52) U.S. Cl.
CPC ......... *A61B 34/37* (2016.02); *A61M 25/0113* (2013.01); *A61M 25/0136* (2013.01);
(Continued)

(58) Field of Classification Search
CPC .............. A61B 34/37; A61B 2034/301; A61B 2017/003; A61M 25/0113; A61M 25/0136; A61M 39/10; A61M 2039/1077
See application file for complete search history.

(56) References Cited

U.S. PATENT DOCUMENTS 6,424,885 B1 * 7/2002 Niemeyer ............. A61B 34/77
600/109
2009/0254083 A1    10/2009 Wallace et al.
(Continued)

FOREIGN PATENT DOCUMENTS

CN      115998450 A      4/2023
CN      218889747 U      4/2023
(Continued)

OTHER PUBLICATIONS

International Search Report and Written Opinion from PCT Application No. PCT/CN2024/112244, received Apr. 25, 2025, pp. 1-14.
(Continued)

*Primary Examiner* — Mohamed G Gabr
*Assistant Examiner* — Khoa Tan Le
(74) *Attorney, Agent, or Firm* — Robert C. Kowert; Kowert, Hood, Munyon, Rankin & Goetzel, P.C.

(57) ABSTRACT

The present disclosure provides a control method and associated apparatus for a surgical assistance system, the control method comprising: in response to a pose adjustment operation input by a user via an operation terminal, sending, by a master console, a pose adjustment command to a robotic arm, such that the robotic arm adjusts a pose of a surgical execution apparatus to a pose corresponding to the pose adjustment operation according to the pose adjustment command; and in response to a catheter system driving operation input by the user via the operation terminal, sending, by the master console, a catheter system driving command to the surgical execution apparatus, such that the surgical drive device drives the catheter system via a sheath adapter to perform a corresponding action. Said control method enables the master console to send corresponding commands to the robotic device, thereby achieving semi-automatic control of the surgical assistance system.

19 Claims, 17 Drawing Sheets

(51) Int. Cl.
 *A61B 34/30* (2016.01)
 *A61M 25/01* (2006.01)
 *A61M 39/10* (2006.01)

(52) U.S. Cl.
 CPC ....... *A61M 39/10* (2013.01); *A61B 2017/003* (2013.01); *A61B 2034/301* (2016.02); *A61M 2039/1077* (2013.01)

(56) References Cited

U.S. PATENT DOCUMENTS

| | | | | |
|---|---|---|---|---|
| 2015/0351864 | A1* | 12/2015 | Kamon | A61B 34/37 606/130 |
| 2015/0366433 | A1* | 12/2015 | Atarot | A61B 1/00149 600/102 |
| 2017/0084027 | A1 | 3/2017 | Mintz et al. | |
| 2018/0296285 | A1* | 10/2018 | Simi | A61B 10/04 |
| 2019/0192239 | A1 | 6/2019 | Xu et al. | |
| 2019/0239972 | A1* | 8/2019 | Chassot | A61B 34/77 |
| 2020/0261160 | A1 | 8/2020 | Peine et al. | |
| 2022/0395350 | A1 | 12/2022 | Kobayashi et al. | |
| 2023/0202040 | A1 | 6/2023 | Lin et al. | |

FOREIGN PATENT DOCUMENTS

| | | | | |
|---|---|---|---|---|
| CN | 116650129 | A | 8/2023 | |
| CN | 117883128 | A | 4/2024 | |
| CN | 118303997 | A * | 7/2024 | A61B 17/00 |
| CN | 118304051 | A | 7/2024 | |
| WO | 2024/140988 | A1 | 7/2024 | |

OTHER PUBLICATIONS

European Search Report from Application No. 24873899.9-1113 PCT/CN2024/112244, Date Jul. 18, 2025, pp. 1-6.

* cited by examiner

CONTROL METHOD AND ASSOCIATED APPARATUS FOR SURGICAL ASSISTANCE SYSTEM

This application is a continuation of International Application No. PCT/CN2024/112244, filed on Aug. 15, 2024, the entire disclosure of which is incorporated by reference herein.

TECHNICAL FIELD

The present disclosure relates to the field of control, and more specifically, to a control method and associated apparatus for a surgical assistance system.

BACKGROUND

In the related art, passive minimally invasive surgical instruments generally necessitate manual manipulations by surgeons during operation. Certain complex surgical procedures or instruments, due to their elevated operational difficulty, demand surgeons to possess advanced technical proficiency and extensive clinical experience, and require prolonged learning curves, which has somewhat hindered their clinical deployments.

Therefore, it is urgent to provide a control method and associated apparatus for a surgical assistance system to solve the above technical problems.

SUMMARY

The present disclosure provides a control method and associated apparatus for a surgical assistance system, which achieves semi-automatic control of the surgical assistance system through said control method, thereby eliminating surgeons' complex manual manipulations of catheter systems and in turn reducing the procedural difficulty, while shortening surgeons' learning curves, thus facilitating the clinical deployment of the surgical assistance system.

In the first aspect, the present disclosure provides a control method for a surgical assistance system, the surgical assistance system including a robotic device and a control device; the robotic device including a robotic arm and a surgical execution apparatus disposed at a distal end of the robotic arm, the robotic arm being configured to adjust a pose of the surgical execution apparatus, the surgical execution apparatus including a catheter system, a sheath adapter and a surgical drive device, the sheath adapter being connected to the surgical drive device and configured to support the catheter system, and the surgical drive device being configured to actuate the catheter system via the sheath adapter;

the control device including a master console that includes an operation terminal and a display screen, the operation terminal being configured to control the robotic device, and the display screen being configured to display a surgical image;

wherein the control method includes:

in response to a pose adjustment operation input by the user via the operation terminal, sending, by the master console, a pose adjustment command to the robotic arm, such that the robotic arm adjusts the pose of the surgical execution apparatus to a pose corresponding to the pose adjustment operation according to the pose adjustment command; and in response to a catheter system driving operation input by the user via the operation terminal, sending, by the master console, a catheter system driving command to the surgical execution apparatus, such that the surgical drive device drives the catheter system via the sheath adapter to perform an action corresponding to the catheter system driving operation.

In the second aspect, the present disclosure also provides a control apparatus for a surgical assistance system, including:

a first sending unit configured to, in response to a pose adjustment operation input by a user via an operation terminal, cause a master console to send a pose adjustment command to a robotic arm, such that the robotic arm adjusts a pose of a surgical execution apparatus to a pose corresponding to the pose adjustment operation according to the pose adjustment command; and a second sending unit configured to, in response to a catheter system driving operation input by the user via the operation terminal, cause the master console to send a catheter system driving command to the surgical execution apparatus, such that a surgical drive device drives a catheter system via a sheath adapter to perform an action corresponding to the catheter system driving operation.

In the third aspect, the present disclosure also provides an electronic device including a processor, a memory and a bus, the memory having stored therein machine-readable instructions executable by the processor, and the processor communicating with the memory through the bus when the electronic device operates, where the machine-readable instructions, when executed by the processor, cause the control method for a surgical assistance system according to the present disclosure to be implemented.

In the fourth aspect, the present disclosure also provides a computer-readable storage medium having a computer program stored thereon, where the computer program, when executed by the processor, causes the control method for a surgical assistance system according to the present disclosure to be implemented.

In the fifth aspect, the present disclosure also provides a computer program product including a computer program, where the computer program, when executed by a processor, causes the control method for a surgical assistance system according to the present disclosure to be implemented.

In summary, the present disclosure provides a control method and associated apparatus for a surgical assistance system, the surgical assistance system including a robotic device and a control device; the robotic device including a robotic arm and a surgical execution apparatus disposed at a distal end of the robotic arm, the robotic arm being configured to adjust a pose of the surgical execution apparatus, the surgical execution apparatus including a catheter system, a sheath adapter and a surgical drive device, the sheath adapter being connected to the surgical drive device and configured to support the catheter system, and the surgical drive device being configured to actuate the catheter system via the sheath adapter; the control device including a master console that includes an operation terminal and a display screen, the operation terminal being configured to control the robotic device, and the display screen being configured to display a surgical image, where the control method includes: in response to a pose adjustment operation input by a user via the operation terminal, sending, by the master console, a pose adjustment command to the robotic arm, such that the robotic arm adjusts the pose of the surgical execution apparatus to a pose corresponding to the pose adjustment operation according to the pose adjustment command; and in response to a catheter system driving operation input by the user via the operation terminal, sending, by the master console, a catheter system driving command to the surgical execution apparatus, such that the surgical drive device drives the catheter system via the sheath adapter to perform an action corresponding to the catheter system driving operation. Said control method enables the master console to, in response to relevant operations input by the user via the operation terminal of the master console, send corresponding commands to the robotic device, such that the robotic arm adjusts the pose of the surgical execution apparatus according to the pose adjustment command and the surgical drive device drives the catheter system via the sheath adapter to perform a corresponding action according to the catheter system driving command, which achieves semi-automatic control of the surgical assistance system, thereby eliminating surgeons' complex manual manipulations of catheter systems and in turn reducing the procedural difficulty, while shortening surgeons' learning curves, thus facilitating the clinical deployment of the surgical assistance system.

Additional advantages of the present disclosure will be described in greater detail in conjunction with the following description and accompanying drawings.

It should be understood that the above description is merely an overview of the technical solutions of the present disclosure, intended to provide a general understanding of the technical means disclosed herein, thereby facilitating implementation in accordance with the contents of the specification. To render the above and other objectives, features and advantages of the present disclosure more apparent and comprehensible, specific embodiments are provided below to illustrate the detailed implementations of the present disclosure.

BRIEF DESCRIPTION OF THE DRAWINGS

To more clearly illustrate the technical solutions of the embodiments of the present disclosure, the drawings required for describing the embodiments will be briefly introduced below. These drawings are incorporated into and constitute a part of this specification. They illustrate embodiments consistent with the present disclosure and, together with the description, serve to explain the technical solutions of the present disclosure. It should be understood that the drawings depict only certain embodiments of the present disclosure and thus should not be construed as limiting the scope of protection. For a person of ordinary skill in the art, other related drawings may be derived from these drawings without creative efforts. Moreover, the same reference numerals are used to denote the same components throughout the drawings. In the drawings.

In the drawings, the same or corresponding reference numerals denote the same or corresponding parts.

Figure 1:
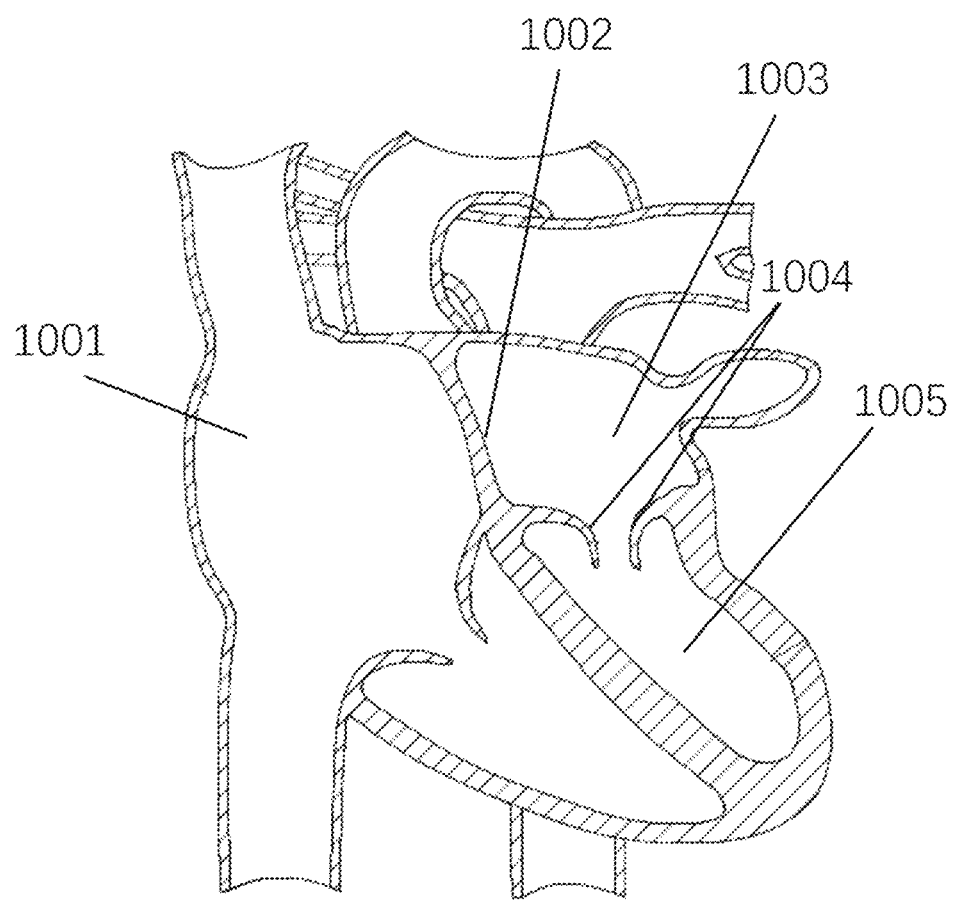
FIG. 1 is a schematic diagram of a heart structure involved in an embodiment of the present disclosure.
Figure 2:
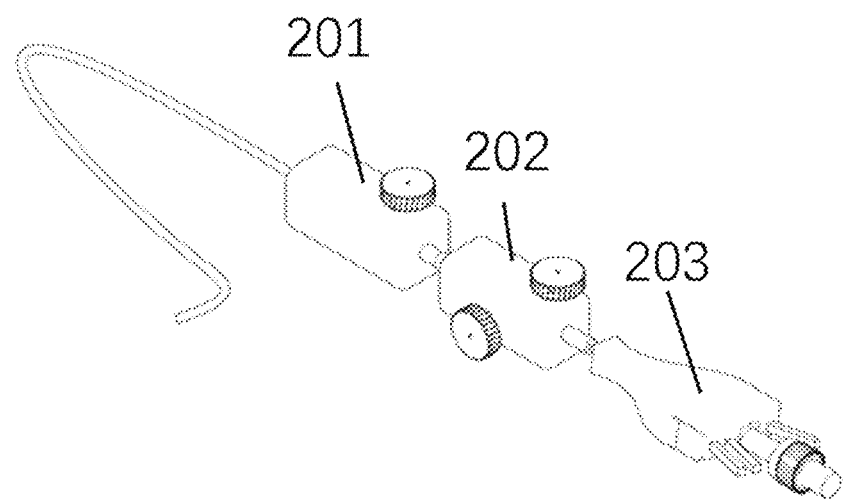
FIG. 2 is a schematic structural diagram of a catheter system according to an embodiment of the present disclosure.

1001: right atrium; 1002: atrial septum; 1003: left atrium; 1004: mitral valve; 1005: left ventricle;

201: outer catheter system; 2011: outer catheter system handle; 2012: outer catheter; 2013: outer catheter system knob;

202: middle catheter system; 2021: middle catheter system handle; 2022: middle catheter; 2023: first middle catheter system knob; 2024: second middle catheter system knob; 203: inner catheter system; 2031: inner catheter system handle; 2032: inner catheter;

2033: clamping element locking rod; 2034: clamping element driving wheel; 2035: first clamping element lever; 2036: second clamping element lever;

204: first clamping element; 205: second clamping element;

300: robotic device; 310: robotic arm; 3101: robotic arm body; 3102: medical bed connector;

320: surgical execution apparatus; 3210: catheter system; 3220: sheath adapter;

3221: outer catheter system adapter; 322101: outer catheter system base; 322102: first outer catheter system transmission assembly; 322103: second outer catheter system transmission assembly; 322104: first input shaft; 322105: second input shaft;

3222: middle catheter system adapter; 322201: middle catheter system base; 322202: first middle catheter system transmission assembly; 322203: second middle catheter system transmission assembly; 322204: third input shaft; 322205: fourth input shaft;

3223: inner catheter system adapter; 322301: inner catheter system base; 322302: inner catheter rotation transmission assembly; 322303: clamping element locking rod transmission assembly; 322304: clamping element driving wheel transmission assembly; 322305: first clamping element lever transmission assembly; 322306: second clamping element lever transmission assembly; 322307: fifth input shaft; 322308: sixth input shaft; 322309: seventh input shaft; 3223010: eighth input shaft; 3223011: ninth input shaft;

3230: surgical drive device; 32301: first output shaft; 32302: second output shaft; 32303: third output shaft; 32304: fourth output shaft; 32305: fifth output shaft; 32306: sixth output shaft; 32307: seventh output shaft; 32308: eighth output shaft; 32309: ninth output shaft; 323010: slave control touchscreen;

330: medical cart; 400: control device; 410: master console; 420: enablement operation switch; 500: medical bed; 600: sterile barrier.

DETAILED DESCRIPTION

The exemplary embodiments of the present disclosure will be described in greater detail below with reference to the accompanying drawings. Although the exemplary embodiments of the present disclosure are shown in the drawings, it should be understood that the present disclosure may be implemented in various forms and should not be construed as limited to the embodiments described herein. Rather, these embodiments are provided to enable a more thorough understanding of the present disclosure and to fully convey the scope of the present disclosure to a person of ordinary skill in the art.

In the description of the embodiments of the present disclosure, it should be understood that terms such as "including" or "having" are intended to indicate the existence of the disclosed features, numerals, steps, actions, components, parts, or any combination thereof in the specification, without excluding the existence of one or more other features, numerals, steps, actions, components, parts, or any combination thereof.

Unless otherwise specified, "/" denotes "or". For example, "A/B" may indicate A or B. The term "and/or" herein merely describes the associative relationship between associated objects, indicating that three possible relationships may exist. For example, "A and/or B" may indicate: A alone, A and B together, or B alone.

Terms such as "first", "second", etc. are used solely to distinguish similar or identical technical features for ease of description and should not be interpreted as indicating or implying relative importance or quantity of the features. Thus, features modified by "first", "second", etc., may explicitly or implicitly include one or more such features. In the description of the embodiments of the present disclosure, unless otherwise specified, the term "plurality" means two or more.

In the related art, passive minimally invasive surgical instruments generally necessitate manual manipulations by surgeons during operation. Certain complex surgical procedures or instruments, due to their elevated operational difficulty, demand surgeons to possess advanced technical proficiency and extensive clinical experience, and require prolonged learning curves, which has somewhat hindered their clinical deployments.

For example, as shown in FIG. 1, the mitral valve, i.e. the left atrioventricular valve, like a "unidirectional valve" situated between the left atrium 1003 and the left ventricle 1005, can ensure the unidirectional flow of blood from the left atrium 1003 to the left ventricle 1005. During diastole of the left ventricle 1005, both leaflets open to allow blood to flow from the left atrium 1003 to the left ventricle 1005. Conversely, during systole of the left ventricle 1005, the chordae tendineae are stretched, thus the mitral valve 1004 prevents blood from flowing from the left atrium 1003 to the left ventricle 1005. However, in diseased states, the mitral valve 1004 fails to return to its closed state during systole of the left ventricle 1005, as it would in a healthy state, resulting in blood regurgitation. In the related art, a mitral valve 1004 repair instrument may be used to clamp the diseased mitral valve 1004, thereby reducing regurgitation.

Figure 3:
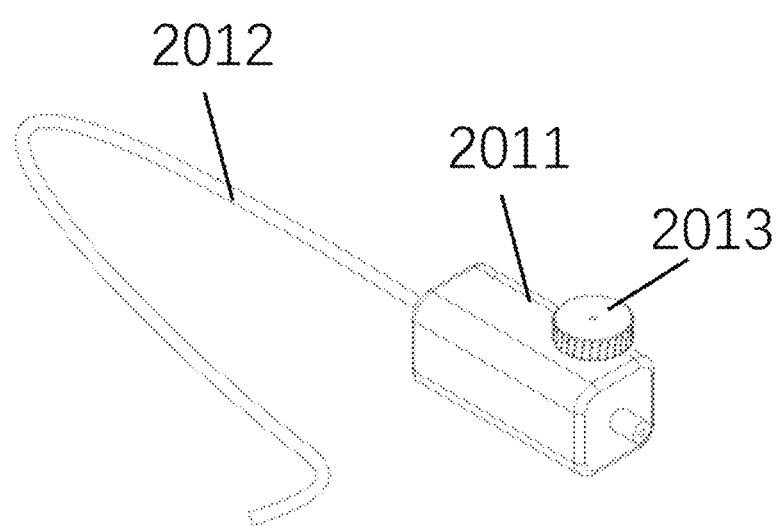
FIG. 3 is a schematic structural diagram of an outer catheter system according to an embodiment of the present disclosure.
Figure 4:
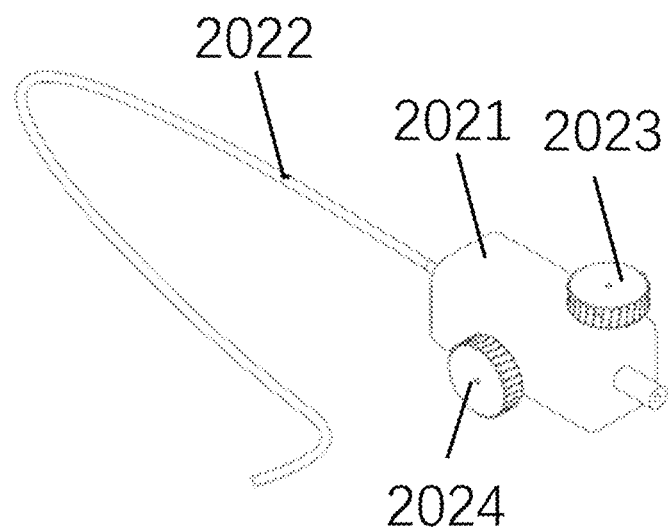
FIG. 4 is a schematic structural diagram of a middle catheter system according to an embodiment of the present disclosure.
Figure 5:
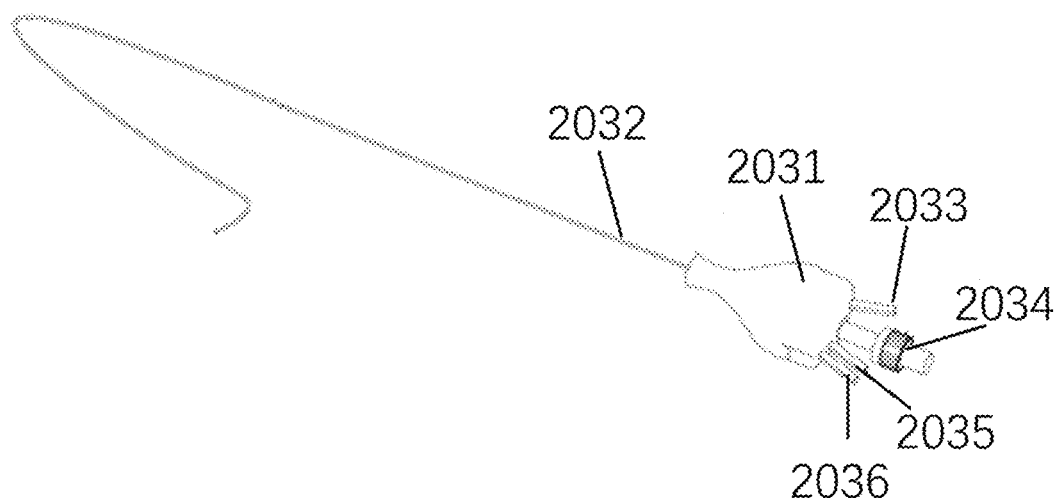
FIG. 5 is a schematic structural diagram of an inner catheter system according to an embodiment of the present disclosure.

Specifically, the present disclosure can use a catheter system as a mitral valve 1004 repair instrument. As shown in FIGS. 2 to 5, the catheter system includes an outer catheter system 201, a middle catheter system 202 and an inner catheter system 203. As shown in FIG. 3, the outer catheter system 201 includes an outer catheter 2012, an outer catheter system knob 2013 and an outer catheter system handle 2011, where the outer catheter 2012 has a proximal end attached to the outer catheter system handle 2011, and the outer catheter system knob 2013 is disposed on the outer catheter system handle 2011 and configured to adjust bending of the distal end of the outer catheter 2012, that is, the outer catheter 2012 can be bent in different directions by rotating the outer catheter system knob 2013 in different directions. As shown in FIG. 4, the middle catheter system 202 includes a middle catheter 2022, a first middle catheter system knob 2023, a second middle catheter system knob 2024 and a middle catheter system handle, where the middle catheter 2022 has a proximal end attached to the middle catheter system handle 2021, and both the first middle catheter system knob 2023 and the second middle catheter system knob 2024 are disposed on the middle catheter system handle 2021, the first middle catheter system knob 2023 being configured to adjust the bending of the distal end of the middle catheter 2022 in a first direction, and the second middle catheter system knob 2024 being configured to adjust the bending of the distal end of the middle catheter 2022 in a second direction. As shown in FIG. 5, the inner catheter system 203 includes an inner catheter 2032, a first clamping element 204, a second clamping element 205, a clamping element locking rod 2033, a clamping element driving wheel 2034, a first clamping element lever 2035, a second clamping element lever 2036 and an inner catheter system handle 2031, where the inner catheter has a proximal end attached to the inner catheter system handle 2031, both the first clamping element 204 and the second clamping element 205 are disposed at the distal end of the inner catheter 2031, the clamping element locking rod 2033 is configured to control unlocking and locking of the first clamping element 204 located at the distal end of the inner catheter 2031, the clamping element driving wheel 2034 is configured to control opening and closing of the first clamping element 204, the first clamping element lever 2035 is configured to control lifting or capturing of the first capturing arm of the second clamping element 205 located at the distal end of the inner catheter 2031, and the second clamping element lever 2036 is configured to control lifting and capturing of the second capturing arm of the second clamping element 205.

Figures 6, 7, 8:
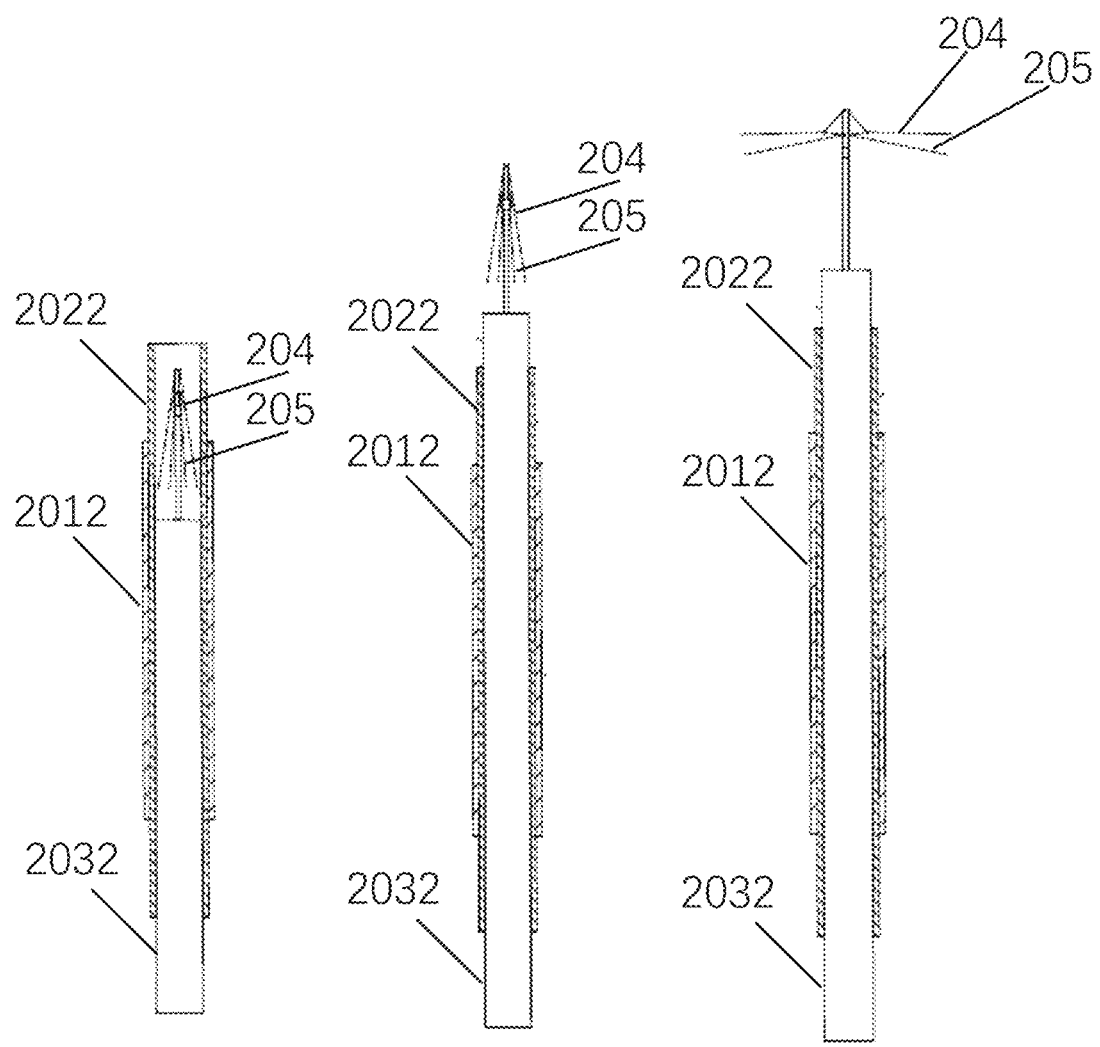
FIG. 6 is a schematic structural diagram of a fixation element and a clamping element in a first state according to an embodiment of the present disclosure.
FIG. 7 is a schematic structural diagram of a fixation element and a clamping element in a second state according to an embodiment of the present disclosure.
FIG. 8 is a schematic structural diagram of a fixation element and a clamping element in a third state according to an embodiment of the present disclosure.

In an actual application of the catheter system, as shown in FIGS. 6 to 8, the outer catheter 2012 is sleeved on the middle catheter 2022, the middle catheter 2022 is sleeved on the inner catheter 2032, and the outer catheter 2012, the middle catheter 2022 and the inner catheter 2032 can move or rotate relative to each other, with a first clamping element 204 and a second clamping element 205 being provided at one end of the inner catheter 2032 opposite to the inner catheter system handle 2031. As shown in FIG. 6, the first clamping element 204 and the second clamping element 205 located at one end of the inner catheter 2032 may be placed inside the middle catheter 2032. As shown in FIG. 7, with the relative movement of the middle catheter 2022 and the inner catheter 2032, the first clamping element 204 and the second clamping element 205 located at one end of the inner catheter 2032 may be pushed out of the middle catheter 2022. As shown in FIG. 8, when the first clamping element 204 and the second clamping element 205 located at one end of the inner catheter 2032 are placed outside the middle catheter 2022, both of them are in the open state.

Figures 9, 10:
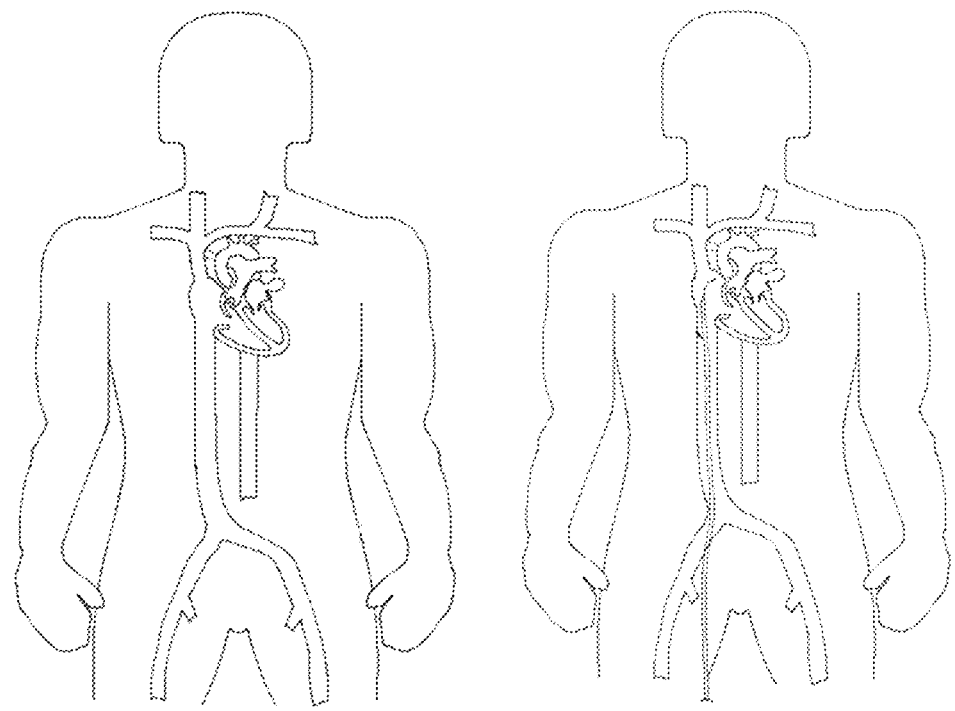
FIG. 9 is a schematic diagram of a human body structure involved in an embodiment of the present disclosure.
FIG. 10 is a schematic structural diagram of a catheter system in a first state where it is introduced into the human body according to an embodiment of the present disclosure.
Figure 11:
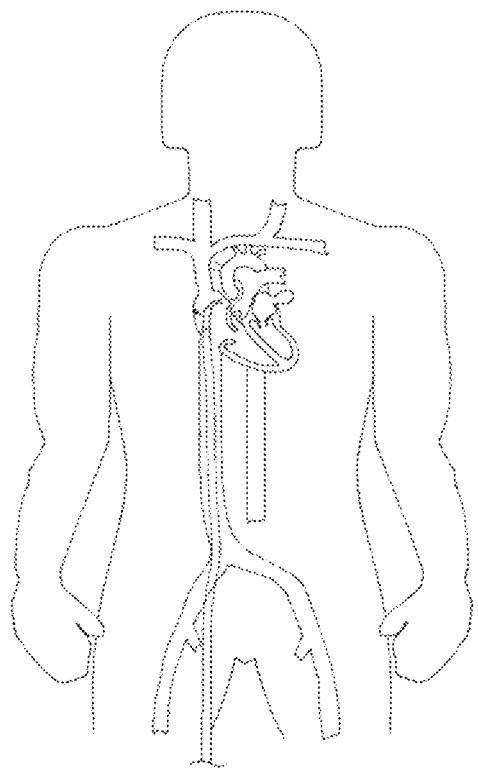
FIG. 11 is a schematic structural diagram of a catheter system in a second state where it is introduced into the human body according to an embodiment of the present disclosure.
Figure 12:
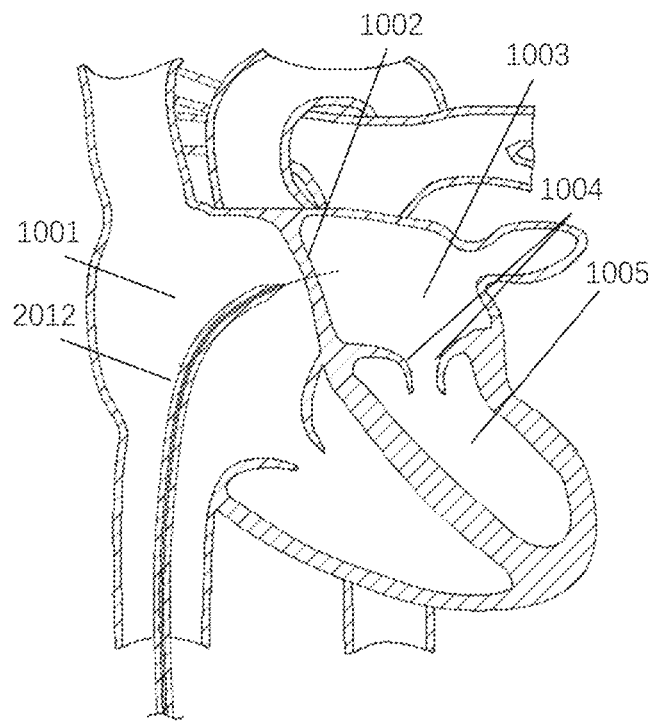
FIG. 12 is a schematic structural diagram of a catheter system in a first state where it is introduced into the heart according to an embodiment of the present disclosure.
Figure 13:
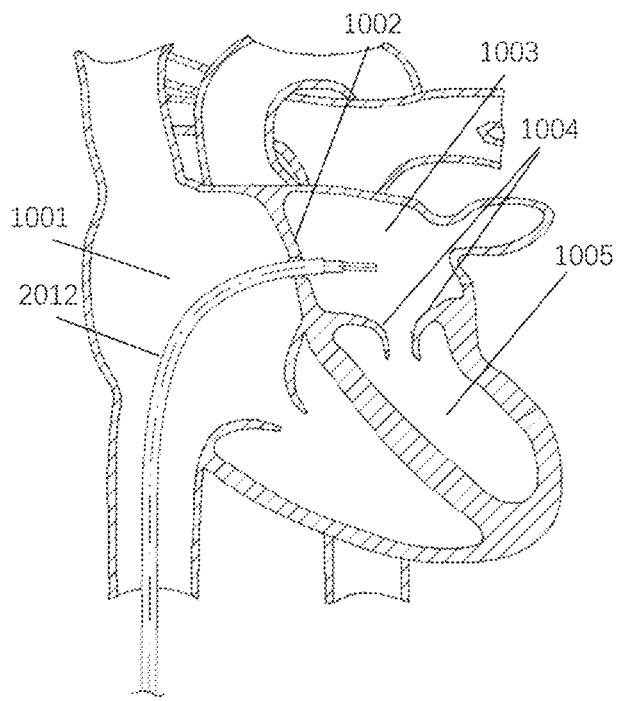
FIG. 13 is a schematic structural diagram of a catheter system in a second state where it is introduced into the heart according to an embodiment of the present disclosure.
Figure 14:
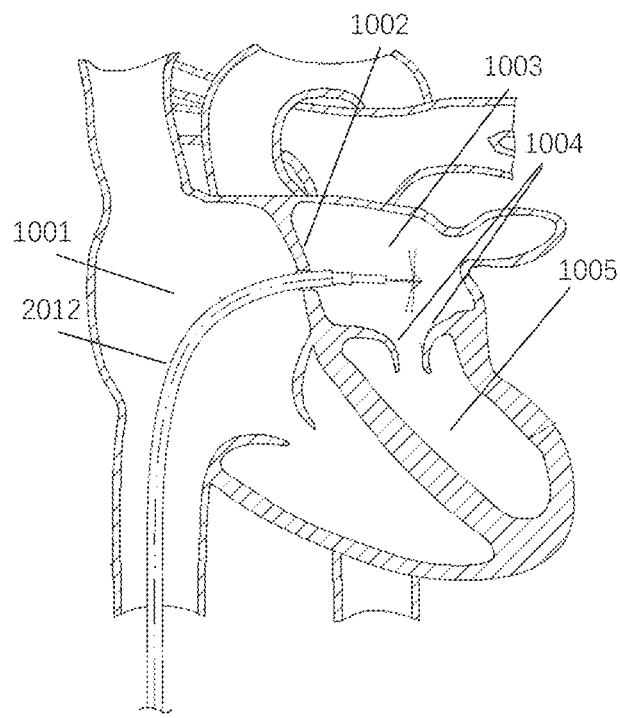
FIG. 14 is a schematic structural diagram of a catheter system in a third state where it is introduced into the heart according to an embodiment of the present disclosure.
Figure 15:
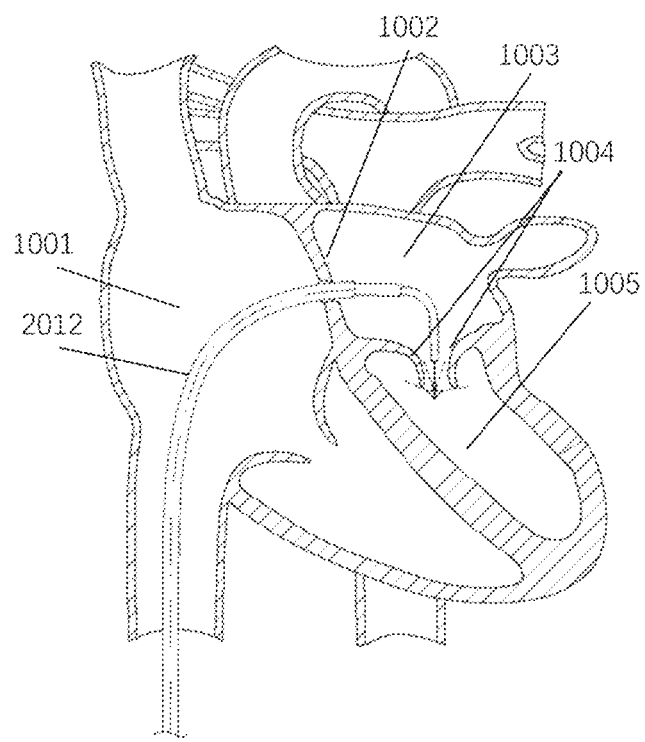
FIG. 15 is a schematic structural diagram of a catheter system in a fourth state where it is introduced into the heart according to an embodiment of the present disclosure.

As shown in FIGS. 9 to 11, the one end of the catheter system provided with the first clamping element 204 and the second clamping element 205 may be introduced into the inferior vena cava via the right femoral vein, then into the superior vena cava, and subsequently into the right atrium 1001. As shown in FIG. 12, the one end provided with the first clamping element 204 and the second clamping element 205 may be located in the right atrium 1001. As shown in FIG. 13, the inner catheter 2032 may pass through the atrial septum 1002 under the guidance of the middle catheter 2022 and the outer catheter 2012 to enter the left atrium 1003. As shown in FIG. 14, within the left atrium 1003, the first clamping element 204 and the second clamping element 205 may be extended out of the middle sheath and then opened. As shown in FIG. 15, the first clamping element 204 may be introduced into the left atrium 1005 through the gap of the mitral valve 1004 while the second clamping element 205 is still kept in the left atrium 1003, and then a corresponding operation is performed to drive the second clamping element 205 to capture the diseased mitral valve 1004 for repair.

In other words, for surgical procedures to treat diseased mitral valves 1004, surgeons are typically required to manually manipulate catheter systems, the procedures are complex, technically challenging, and time-consuming. Moreover, during the procedures, the surgeries shall be performed under the guidance of Digital Subtraction Angiography (DSA) equipment in most cases, resulting in prolonged exposure of the surgeons to radiation, which poses significant health risks.

In view of this, the present disclosure provides a control method and associated apparatus for a surgical assistance system. Through said control method, semi-automatic control of the surgical assistance system is achieved, thereby eliminating surgeons' complex manual manipulations of catheter systems and in turn reducing the procedural difficulty, while shortening surgeons' learning curves, thus facilitating the clinical deployment of the surgical assistance system.

The control method for the surgical assistance system according to embodiments of the present disclosure may be implemented by a computing device which may be a terminal device or a server. The server may be a standalone physical server, a server cluster or distributed system including multiple physical servers, or a cloud server providing a cloud computing service. Examples of the terminal device include but are not limited to a mobile phone, a computer, a smart voice interaction device, a smart home appliance, a vehicle terminal, a drone, etc. The terminal device and the server may be directly or indirectly connected via wired or wireless communication, and the present disclosure imposes no limitation in this regard.

The control method for the surgical assistance system according to the present disclosure is described below in method embodiments. The control method is applicable to a surgical assistance system including a robotic device 300 and a control device 400.

The robotic device 300 includes a robotic arm 310 and a surgical execution apparatus 320 disposed at the distal end of the robotic arm 310, where the robotic arm 310 is configured to adjust the pose of the surgical execution apparatus 320.

The surgical execution apparatus 320 includes a catheter system 3210, a sheath adapter 3220 and a surgical drive device 3230, where the sheath adapter 3220 is connected to the surgical drive device 3230 and configured to support the catheter system 3210, and the surgical drive device 3230 is configured to actuate the catheter system 3210 via the sheath adapter 3220.

The control device 400 includes a master console 410 including an operation terminal and a display screen, where the operation terminal is configured to control the robotic device 300, and the display screen is configured to display a surgical image.

Figure 16:
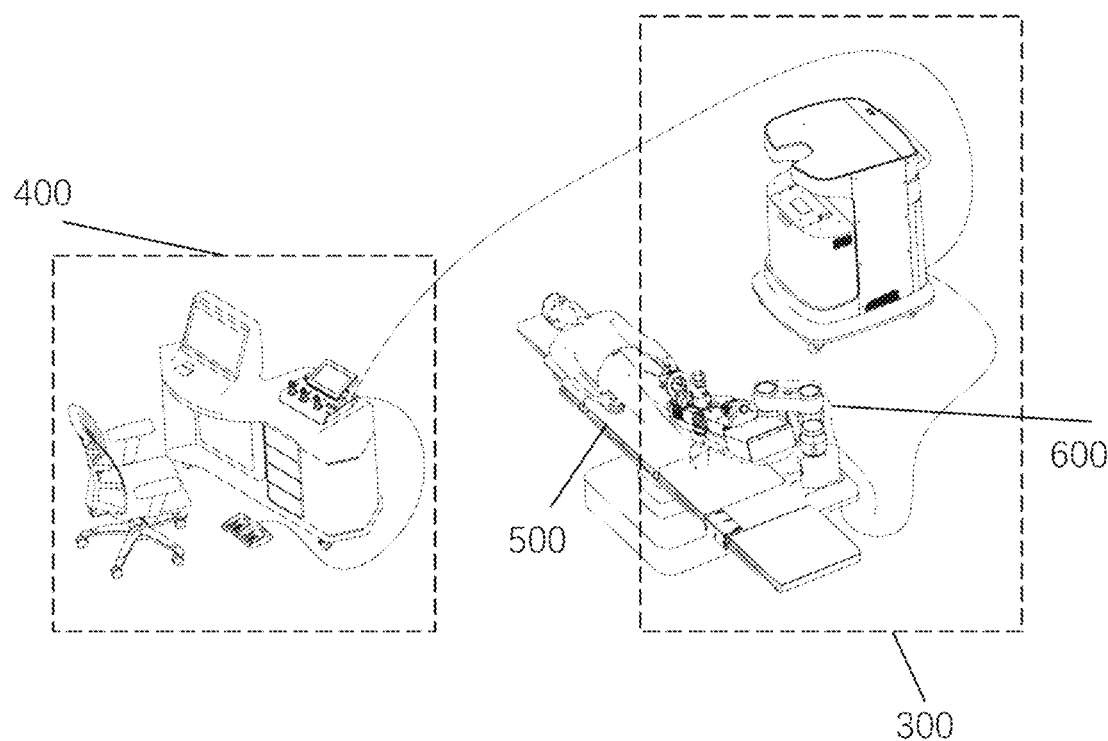
FIG. 16 is a schematic structural diagram of a surgical assistance system according to an embodiment of the present disclosure.

Specifically, as shown in FIG. 16, the surgical assistance system may include a robotic device 300 and a control device 400. For mitral valve 1004 repair surgeries, the surgical assistance system may further include a sterile barrier 600 and a medical bed 500 in addition to the robotic device 300 and the control device 400. The robotic device 300, the sterile barrier 600, and the medical bed 500 may be in the operating room together with the patient. To avoid exposure of surgeons operating the control device 400 to radiation, the control device 400 may be positioned outside the operating room.

Figure 17:
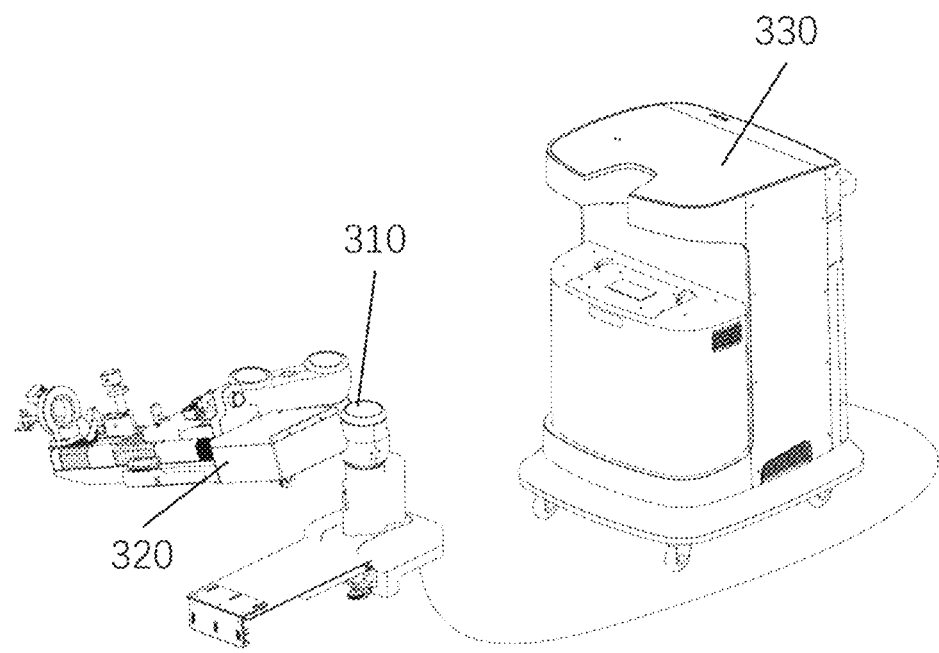
FIG. 17 is a schematic structural diagram of a robotic device according to an embodiment of the present disclosure.

As shown in FIG. 17, the robotic device 300 may include a robotic arm 310 and a surgical execution apparatus 320 disposed at the distal end of the robotic arm 310. The robotic arm 310 may be an articulated robotic arm or other configurations. The robotic arm 310 may adjust the pose of the surgical execution apparatus 320 disposed at the distal end of the robotic arm 310. The pose of the surgical execution apparatus 320 may include its three-dimensional spatial position and orientation.

Figure 18:
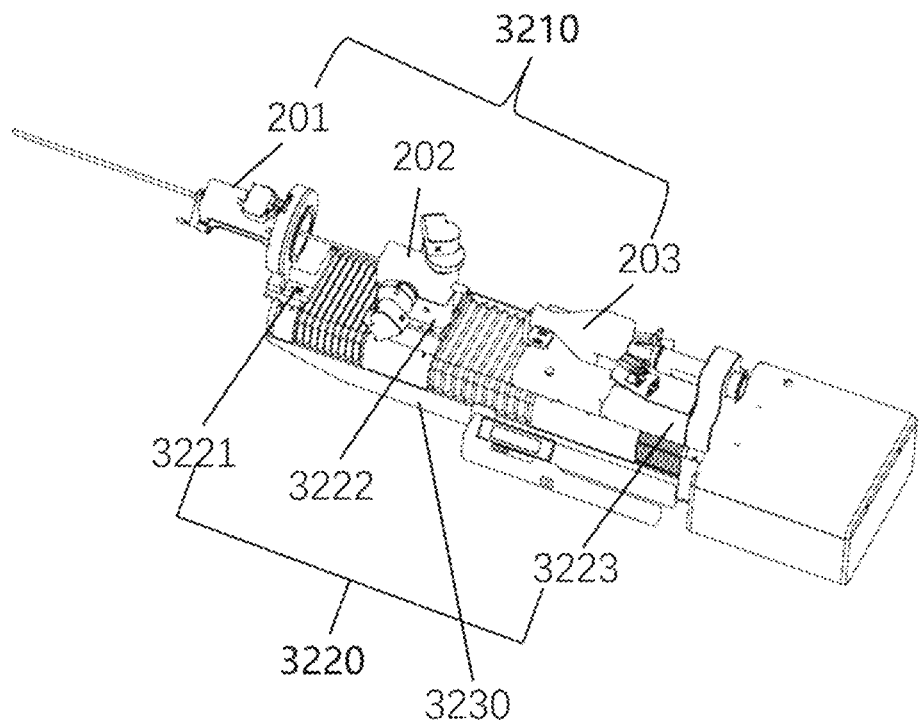
FIG. 18 is a schematic structural diagram of a surgical execution apparatus including a catheter system according to an embodiment of the present disclosure.
Figure 19:
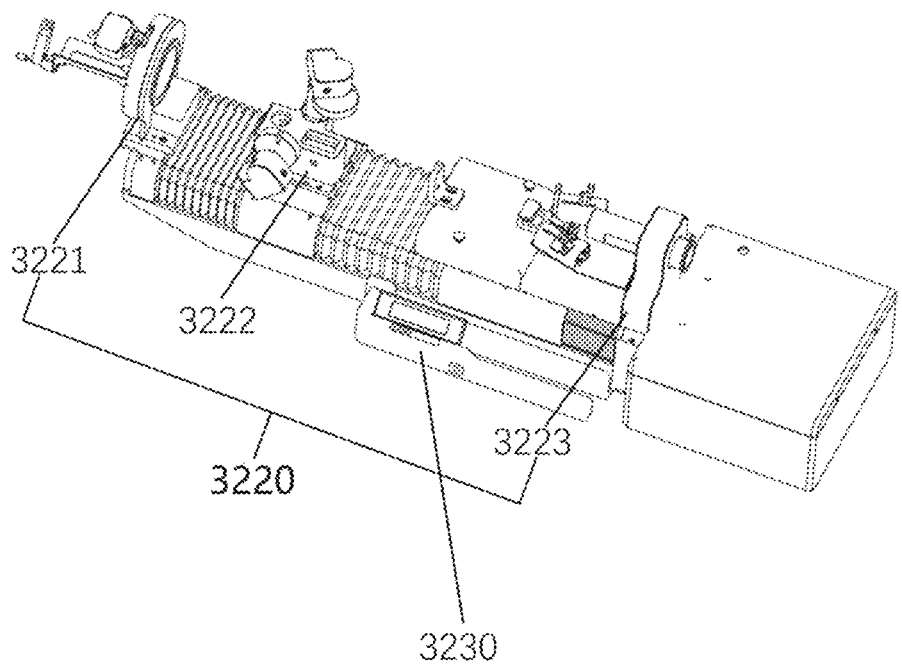
FIG. 19 is a schematic structural diagram of a surgical execution apparatus including a catheter system according to an embodiment of the present disclosure.

As shown in FIG. 18 and FIG. 19, the surgical execution apparatus 320 may include a catheter system 3210, a sheath adapter 3220 and a surgical drive device 3230. The sheath adapter 3220 is connected to the surgical drive device 3230 and configured to support the catheter system 3210, that is, the sheath adapter 3220 can carry the catheter system 3210 and fixedly connect it to the surgical drive device 3230. The sheath adapter 3220 in FIG. 18 is equipped with a corresponding catheter system 3210, and the sheath adapter 3220 in FIG. 19 is not equipped with a catheter system 3210. The surgical drive device 3230 is configured to actuate the catheter system 3210 via the sheath adapter 3220, that is, the surgical drive device 3230 can transmit power to the catheter system 3210 via the sheath adapter 3220 to actuate the catheter system 3210.

Figure 20:
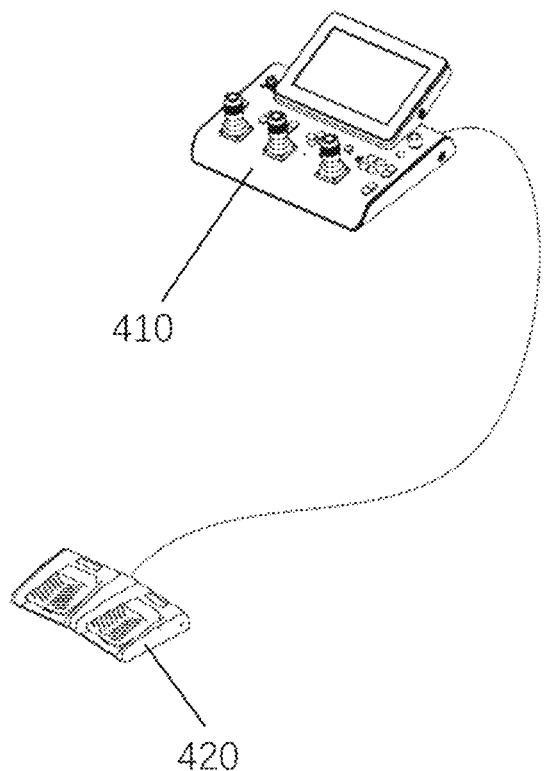
FIG. 20 is a schematic structural diagram of a control device according to an embodiment of the present disclosure.

As shown in FIG. 20, the control device 400 includes a master console 410 including an operating terminal and a display screen. The operating terminal may include functional hardware such as an operation handle and an operation button. The operating terminal is configured to control the robotic device 300, and the display screen is configured to display the surgical image. The surgical image refers to intraoperative imaging data captured during the surgical procedure, such as ultrasound images, Computed Tomography (CT) images, etc., enabling the user to intuitively access real-time surgical information.

Figure 21:
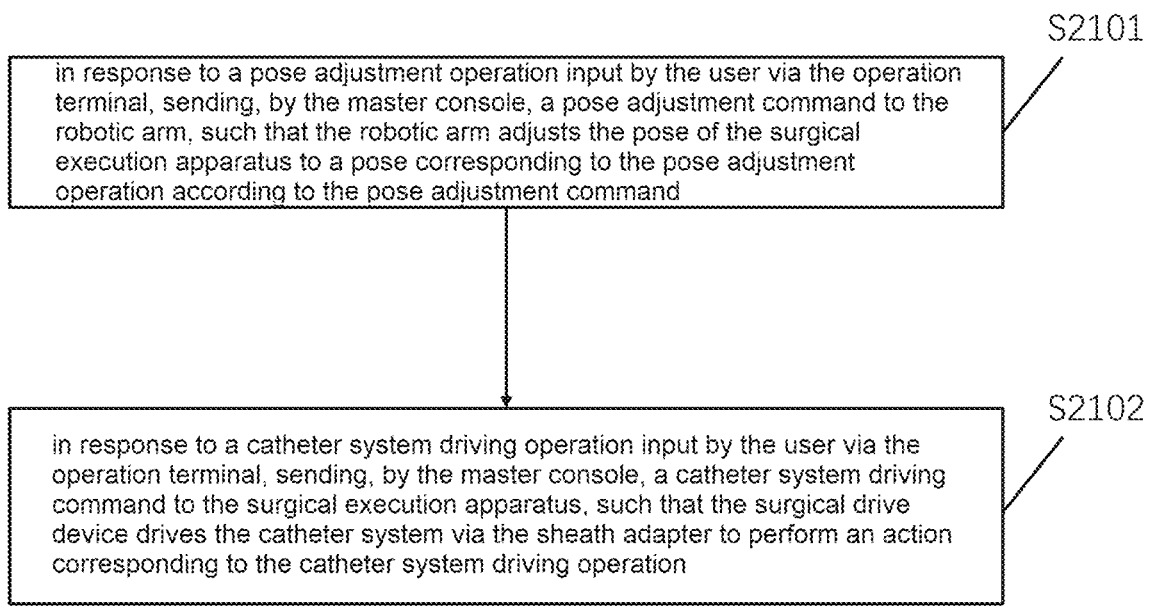
FIG. 21 is a flowchart of a control method for a surgical assistance system according to an embodiment of the present disclosure.

As shown in FIG. 21 that is a flowchart of a control method for a surgical assistance system according to an embodiment of the present disclosure (where the aforementioned computing device may be a server), the control method includes the following operations.

S2101: in response to a pose adjustment operation input by a user via the operation terminal, the master console 410 sends a pose adjustment command to the robotic arm 310, such that the robotic arm 310 adjusts the pose of the surgical execution apparatus 320 to a pose corresponding to the pose adjustment operation according to the pose adjustment command.

S2102: in response to a catheter system 3210 driving operation input by the user via the operation terminal, the master console 410 sends a catheter system driving command to the surgical execution apparatus 320, such that the surgical drive device 3230 drives the catheter system 3210 via the sheath adapter 3220 to perform an action corresponding to the catheter system 3210 driving operation.

Specifically, for the surgical execution apparatus 320, in order to adjust its position and orientation, the master console 410 may send, in response to a pose adjustment operation input by the user via the operation terminal of the master console 410, a pose adjustment command corresponding to the pose adjustment operation to the robotic arm 310, where the pose adjustment operation refers to an operation input by the user via the operation terminal of the master console 410 for adjusting the pose of the surgical execution apparatus 320, and the pose adjustment command refers to a command sent by the master console 410 to the robotic arm 310 for adjusting the pose of the surgical execution apparatus 320. Upon receiving the pose adjustment command, the robotic arm 310 may adjust the pose of the surgical execution apparatus 320 according to the pose adjustment command.

After adjusting the pose of the surgical execution apparatus 320, for the catheter system 3210 on the surgical execution apparatus 320, in order to drive it to perform a corresponding action, the master console 410 may send, in response to a catheter system driving operation input by the user via the operation terminal of the master console 410, a catheter system driving command corresponding to the catheter system driving operation to the surgical execution apparatus 320, where the catheter system driving operation refers to an operation input by the user via the operation terminal of the master console 410 for actuating the catheter system 3210, and the catheter system driving command refers to a command sent by the master console 410 to the surgical drive device 3230 for driving the catheter system 3210 to perform a corresponding action. Upon receiving the catheter system driving command, the surgical drive device 3230 may drive the catheter system 3210 via the sheath adapter 3220 to perform an action corresponding to the catheter system driving operation according to the catheter system driving command.

In other words, the master console 410 is enabled to send, in response to relevant operations input by the user via the operation terminal of the master console 410, corresponding commands to the robotic device 300, such that the robotic arm 310 adjusts the pose of the surgical execution apparatus 320 according to the pose adjustment command and drives the catheter system 3210 via the sheath adapter 3220 to perform a corresponding action according to the catheter system driving command, which achieves semi-automatic control of the surgical assistance system, thereby eliminating surgeons' complex manual manipulation of the catheter system and in turn the procedural difficulty, while shortening surgeons' learning curves, thus facilitating the clinical deployment of the surgical assistance system.

In a possible implementation, as shown in FIGS. 2 to 5, for the mitral valve 1004 repair surgery, the catheter system 3210 may include an outer catheter system 201, a middle catheter system 202, and an inner catheter system 203.

As shown in FIG. 19, the sheath adapter 3220 may include an outer catheter system adapter 3221, a middle catheter system adapter 3222, and an inner catheter system adapter 3223, where the outer catheter system adapter 3221 is configured to support the outer catheter system 201, the middle catheter system adapter 3222 is configured to support the middle catheter system 202, and the inner catheter system adapter 3223 is configured to support the inner catheter system 203. As such, the surgical drive device 3230 is configured to actuate the outer catheter system 201 via the outer catheter system adapter 3221, the middle catheter system 202 via the middle catheter system adapter 3222, and the inner catheter system 203 via the inner catheter system adapter 3223. As shown in FIG. 20, in order to enable individualized control of the outer catheter system 201, the middle catheter system 202, and the inner catheter system 203, the operation terminal may include an outer catheter system operation terminal, a middle catheter system operation terminal, and an inner catheter system operation terminal.

S2102 in which the master console 410 sends, in response to the catheter system driving operation input by the user via the operation terminal, the catheter system driving command to the surgical execution apparatus 320, such that the surgical drive device 3230 drives the catheter system 3210 via the sheath adapter to perform an action corresponding to the catheter system driving operation specifically includes the following operations.

S101: in response to an outer catheter system driving operation input by the user via the outer catheter system operation terminal, the master console 410 sends an outer catheter system driving command to the surgical execution apparatus 320, such that the surgical drive device 3230 drives the outer catheter system 201 via the outer catheter system adapter 3221 to perform an action corresponding to the outer catheter system driving operation.

S102: in response to a middle catheter system driving operation input by the user via the middle catheter system operation terminal, the master console 410 sends a middle catheter system driving command to the surgical execution apparatus 320, such that the surgical drive device 3230 drives the middle catheter system 202 via the middle catheter system adapter 3222 to perform an action corresponding to the middle catheter system driving operation.

S103: in response to an inner catheter system driving operation input by the user via the inner catheter system operation terminal, the master console 410 sends an inner catheter system driving command to the surgical execution apparatus 320, such that the surgical drive device 3230 drives the inner catheter system 203 via the inner catheter system adapter 3223 to perform an action corresponding to the inner catheter system driving operation.

Specifically, for the outer catheter system 201 included in the catheter system 3210, in order to drive it to perform a corresponding action, the master console 410 may send, in response to the outer catheter system driving operation input by the user via the operation terminal of the master console 410, the outer catheter system driving command corresponding to the outer catheter system driving operation to the surgical execution apparatus 320, where the outer catheter system driving operation refers to an operation input by the user via the operation terminal of the master console 410 for actuating the outer catheter system 201, and the outer catheter system driving command refers to a command sent by the master console 410 to the surgical drive device 3230 for driving the outer catheter system 201 to perform a corresponding action. Upon receiving the outer catheter system driving command, the surgical drive device 3230 may drive the outer catheter system 201 via the outer catheter system adapter 3221 to perform the action corresponding to the outer catheter system driving operation according to the outer catheter system driving command.

Correspondingly, for the middle catheter system 202 included in the catheter system 3210, in order to drive it to perform a corresponding action, the master console 410 may send, in response to the middle catheter system driving operation input by the user via the operation terminal of the master console 410, the middle catheter system driving command corresponding to the middle catheter system driving operation to the surgical execution apparatus 320, where the middle catheter system driving operation refers to an operation input by the user via the operation terminal of the master console 410 for actuating the middle catheter system 202, and the middle catheter system driving command refers to a command sent by the master console 410 to the surgical drive device 3230 for driving the middle catheter system 202 to perform a corresponding action. Upon receiving the middle catheter system driving command, the surgical drive device 3230 may drive the middle catheter system 202 via the middle catheter system adapter 3222 to perform the action corresponding to the middle catheter system driving operation according to the middle catheter system driving command.

Correspondingly, for the inner catheter system 203 included in the catheter system 3210, in order to drive it to perform a corresponding action, the master console 410 may send, in response to the inner catheter system driving operation input by the user via the operation terminal of the master console 410, an inner catheter system driving command corresponding to the inner catheter system driving operation to the surgical execution apparatus 320, where the inner catheter system driving operation refers to an operation input by the user via the operation terminal of the master console 410 for actuating the inner catheter system 203, and the inner catheter system driving command refers to a command sent by the master console 410 to the surgical drive device 3230 for driving the inner catheter system 203 to perform a corresponding action. Upon receiving the inner catheter system driving command, the surgical drive device 3230 may drive the inner catheter system 203 via the inner catheter system adapter 3223 to perform the action corresponding to the inner catheter system driving operation according to the inner catheter system driving command.

In other words, the master console 410 is enabled to send, in response to relevant operations input by the user via the operation terminal of the master console 410 for the outer catheter system 201, the middle catheter system 202 and the inner catheter system 203, relevant commands for the outer catheter system 201, the middle catheter system 202 and the inner catheter system 203 to the surgical execution apparatus 320, such that the surgical drive device 3230 actuates the outer catheter system 201, the middle catheter system 202 and the inner catheter system 203 via respective catheter adapters according to the relevant commands, thereby achieving semi-automatic control of the surgical assistance system.

In a possible implementation, as shown in FIG. 3, the outer catheter system 201 includes an outer catheter 2012, an outer catheter system knob 2013 and an outer catheter system handle 2011, where the outer catheter 2012 has a proximal end attached to the outer catheter system handle 2011, and the outer catheter system knob 2013 is disposed on the outer catheter system handle 2011 and configured to adjust the bending of the distal end of the outer catheter 2012.

Figure 22:
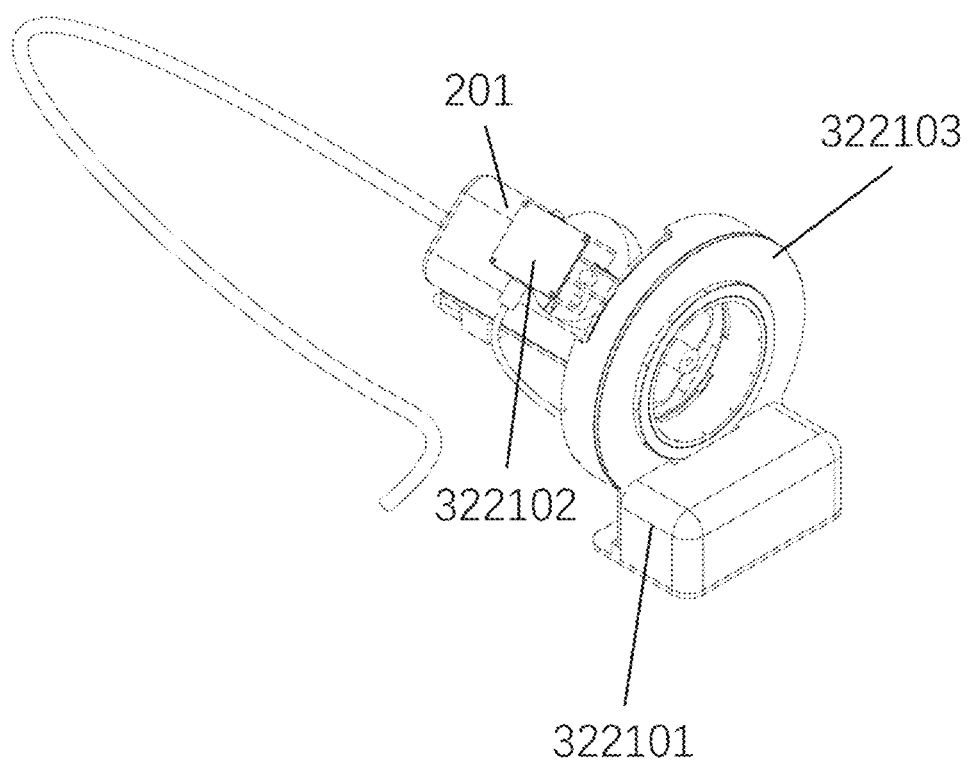
FIG. 22 is a schematic structural diagram of an outer catheter system adapter supporting an outer catheter system in a first perspective view according to an embodiment of the present disclosure.
Figure 23:
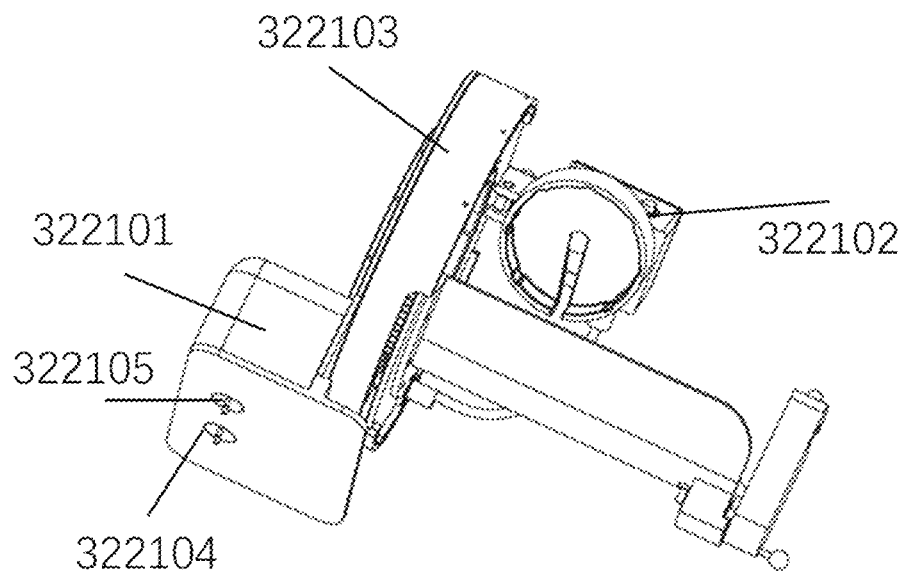
FIG. 23 is a schematic structural diagram of an outer catheter system adapter in a second perspective view according to an embodiment of the present disclosure.

As shown in FIGS. 22 and 23, the outer catheter system adapter 3221 may include an outer catheter system base

322101, a first outer catheter system transmission assembly 322102 and a second outer catheter system transmission assembly 322103, where the first outer catheter system transmission assembly 322102 is disposed on the outer catheter system base 322101 and engaged with the outer catheter system knob 2013, and the second outer catheter system transmission assembly 322103 is disposed on the outer catheter system base 322101 and engaged with the outer catheter system handle 2011. As shown in FIG. 22, the outer catheter system 201 may be carried on the outer catheter system adapter 3221.

Figure 24:
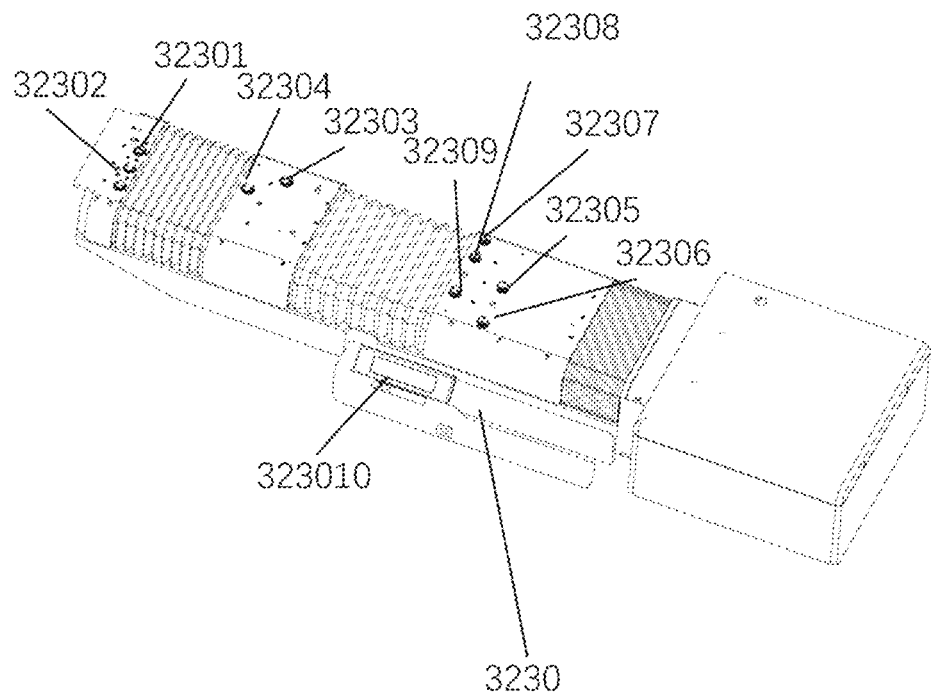
FIG. 24 is a schematic structural diagram of a surgical drive device according to an embodiment of the present disclosure.

The surgical drive device 3230 includes a first outer catheter system driving assembly, a second outer catheter system driving assembly and a third outer catheter system driving assembly, where the first outer catheter system driving assembly is connected to the first outer catheter system transmission assembly 322102, the second outer catheter system driving assembly is connected to the second outer catheter transmission assembly, and the third outer catheter system driving assembly is configured to drive the surgical drive device 3230 to extend or retract. As shown in FIG. 24, the first output shaft 32301 and the second output shaft 32302 of the surgical drive device 3230 may be configured to mate with the first input shaft 322104 and the second input shaft 322105 of the outer catheter system adapter 3221 respectively to connect the first outer catheter system driving assembly to the first outer catheter system transmission assembly 322102 and the second outer catheter system driving assembly to the second outer catheter system transmission assembly 322103. Moreover, the mounting surface of the surgical drive device 3230 is also designed with a locating pin and a fixed mounting hole for facilitating the installation of the outer catheter system adapter 3221 onto the surgical drive device 3230.

As shown in FIG. 20, the outer catheter system operation terminal includes an outer catheter system operation button and an outer catheter system operation handle.

S101 where the master console 410 sends, in response to the outer catheter system driving operation input by the user via the outer catheter system operation terminal, the outer catheter system driving command to the surgical execution apparatus 320, such that the surgical drive device 3230 drives the outer catheter system 201 via the outer catheter system adapter 3221 to perform an action corresponding to the outer catheter system driving operation includes the following operations.

S11: in response to an outer catheter movement operation input by the user via the outer catheter system operation handle or the outer catheter system operation button, the master console 410 sends an outer catheter movement command to the surgical execution apparatus 320, such that the surgical drive device 3230 is driven by the third outer catheter driving assembly to extend or retract to drive the outer catheter system 201 to move, thereby adjusting the outer catheter 2012 to a first target position.

S12: in response to an outer catheter bending operation input by the user via the outer catheter system operation button, the master console 410 sends an outer catheter bending command to the surgical execution apparatus 320, such that the outer catheter system knob 2013 is driven by the first outer catheter driving assembly via the first outer catheter system transmission assembly 322102 to rotate, thereby adjusting a bending angle of the distal end of the outer catheter 2012 to a first target bending angle.

S13: in response to an outer catheter rotation operation input by the user via the outer catheter system operation handle, the master console 410 sends an outer catheter rotation command to the surgical execution apparatus 320, such that the outer catheter system handle 2011 is driven by the second outer catheter driving assembly via the second outer catheter system transmission assembly 322103 to rotate, thereby adjusting a bending direction of the distal end of the outer catheter 2012 to a first target bending direction.

Specifically, for the outer catheter system 201, in order to drive it to perform a corresponding movement action, the master console 410 may send, in response to the outer catheter movement operation input by the user via the outer catheter system operation handle or the outer catheter system operation button, the outer catheter movement command corresponding to the outer catheter movement operation to the surgical execution apparatus 320, where the outer catheter movement operation refers to an operation input by the user via the outer catheter system operation handle or the outer catheter system operation button for actuating the outer catheter 2012, and the outer catheter movement command refers to a command sent by the master console 410 to the surgical drive device 3230 for controlling the movement of the outer catheter 2012. Since the outer catheter system 201 is disposed on the surgical drive device 3230, upon receiving the outer catheter movement command, the surgical drive device 3230 may be driven by the third outer catheter driving assembly to extend or retract to drive the outer catheter system 201 to move, thereby adjusting the outer catheter 2012 to the first target position, where the first target position refers to a desired position that the outer catheter 2012 is expected to reach corresponding to the outer catheter movement operation.

For the outer catheter system 201, in order to drive it to perform a corresponding bending action, the master console 410 may send, in response to the outer catheter bending operation input by the user via the outer catheter system operation button, the outer catheter bending command corresponding to the outer catheter bending operation to the surgical execution apparatus 320, where the outer catheter bending operation refers to an operation input by the user via the outer catheter system operation button for bending the outer catheter 2012, and the outer catheter bending command refers to a command sent by the master console 410 to the surgical drive device 3230 for driving the outer catheter 2012 to bend. Since the first outer catheter driving assembly of the surgical drive device 3230 is connected to the outer catheter system knob 2013 configured to adjust the bending of the distal end of the outer catheter 2012, upon the surgical drive device 3230 receiving the outer catheter bending command, the first outer catheter driving assembly may drive the outer catheter system knob 2013 to rotate, thereby adjusting the bending angle of the distal end of the outer catheter 2012 to the first target bending angle, where the first target angle refers to a desired bending angle that the outer catheter 2012 is expected to achieve corresponding to the outer catheter bending operation.

For the outer catheter system 201, in order to drive it to perform a corresponding rotation action, the master console 410 may send, in response to the outer catheter rotation operation input by the user via the outer catheter system operation handle, the outer catheter rotation command corresponding to the outer catheter rotation operation to the surgical execution apparatus 320, where the outer catheter rotation operation refers to an operation input by the user via the outer catheter system operation handle for rotating the outer catheter 2012, and the outer catheter rotation command refers to a command sent by the master console 410 to the surgical drive device 3230 for driving the outer catheter 2012 to rotate. Since the second outer catheter driving assembly of the surgical drive device 3230 is connected to the outer catheter system handle 2011, upon the surgical drive device 3230 receiving the outer catheter rotation command, the second outer catheter driving assembly may drive the outer catheter system handle 2011 to rotate, thereby adjusting the bending direction of the distal end of the outer catheter 2012 to the first target bending direction, where the first target bending direction refers to a desired bending direction that the outer catheter 2012 is expected to achieve corresponding to the outer catheter rotation operation.

In other words, the master console 410 is enabled to send, in response to the outer catheter movement operation, the outer catheter bending operation and the outer catheter rotation operation input by the user via the outer catheter system operation terminal of the master console 410 for the outer catheter system, the outer catheter movement command, the outer catheter bending command and the outer catheter rotation commands for the outer catheter system 201 to the surgical execution apparatus 320, such that the surgical drive device 3230 achieves movement, bending and rotation of the outer catheter 2012 according to the relevant commands respectively.

In a possible implementation, as shown in FIG. 4, the middle catheter system 202 includes a middle catheter 2022, a first middle catheter system knob 2023, a second middle catheter system knob 2024, and a middle catheter system handle 2021, where the middle catheter 2022 has a proximal end attached to the middle catheter system handle 2021, and both the first middle catheter system knob 2023 and the second middle catheter system knob 2024 are disposed on the middle catheter system handle 2021, the first middle catheter system knob 2023 being configured to adjust the bending of the distal end of the middle catheter 2022 in a first direction, and the second middle catheter system knob 2024 being configured to adjust the bending of the distal end of the middle catheter 2022 in a second direction.

Figure 25:
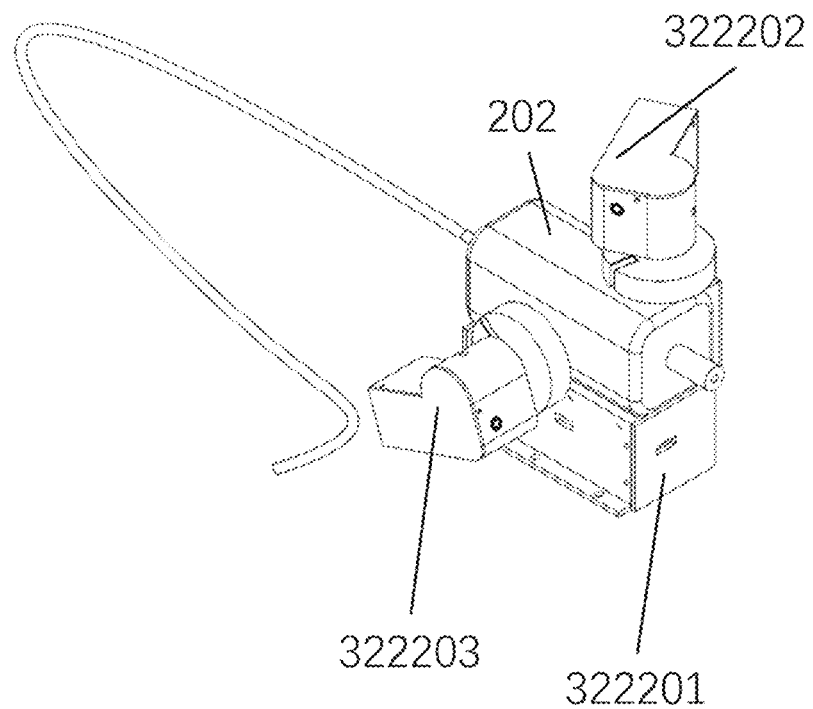
FIG. 25 is a schematic structural diagram of a middle catheter system adapter supporting a middle catheter system in a second perspective view according to an embodiment of the present disclosure.
Figure 26:
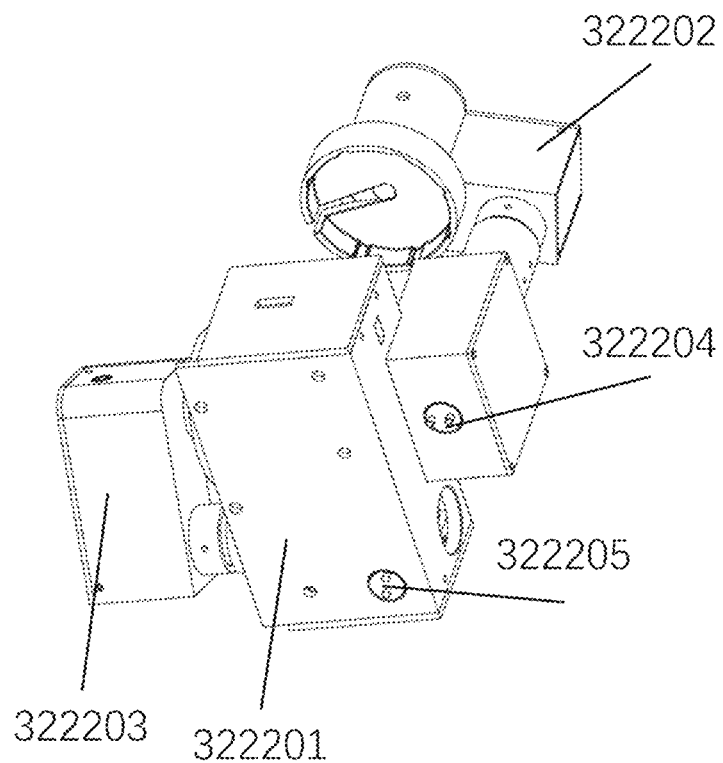
FIG. 26 is a schematic structural diagram of a middle catheter system adapter in a second perspective view according to an embodiment of the present disclosure.

As shown in FIGS. 25 and 26, the middle catheter system adapter 3222 includes a middle catheter system base 322201, a first middle catheter system transmission assembly 322202, and a second middle catheter system transmission assembly 322203, where the first middle catheter system transmission assembly 322202 is disposed on the middle catheter system base 322201 and engaged with the first middle catheter system knob 2023, and the second middle catheter system transmission assembly 322203 is disposed on the middle catheter system base 322201 and engaged with the second middle catheter system knob 2024. As shown in FIG. 26, the middle catheter system 202 may be carried on the middle catheter system adapter 3222.

The surgical drive device 3230 may include a first middle catheter system driving assembly, a second middle catheter system driving assembly and a third middle catheter system driving assembly, where the first middle catheter system driving assembly is connected to the first middle catheter system transmission assembly 322202, the second middle catheter system driving assembly is connected to the second middle catheter system transmission assembly 322203, and the third middle catheter driving assembly is configured to drive the surgical drive device 3230 to extend or retract. As shown in FIG. 24, the third output shaft 32303 and the fourth output shaft 32304 of the surgical drive device 3230 may be configured to mate with the third input shaft 322204 and the fourth input shaft 322205 of the middle catheter system adapter 3222 respectively to connect the first middle catheter system driving assembly to the first middle catheter system transmission assembly 322202 and the second middle catheter system driving assembly to the second middle catheter system transmission assembly 322203. Moreover, the mounting surface of the surgical drive device 3230 is also designed with a locating pin and a fixed mounting hole for facilitating the installation of the middle catheter system adapter 3222 onto the surgical drive device 3230.

The middle catheter system operation terminal includes a first middle catheter system operation button, a second middle catheter system operation button and a middle catheter system operation handle.

S102 where the master console 410 sends, in response to the middle catheter system driving operation input by the user via the middle catheter system operation terminal, the middle catheter system driving command to the surgical execution apparatus 320, such that the surgical drive device 3230 drives the middle catheter system 202 via the middle catheter system adapter 3222 to perform an action corresponding to the middle catheter system driving operation includes the following operations.

S21: in response to a middle catheter movement operation input by the user via the middle catheter operation handle, the master console 410 sends a middle catheter movement command to the surgical execution apparatus 320, such that the surgical drive device 3230 is driven by the third middle catheter system driving assembly to extend or retract to drive the middle catheter system 202 to move, thereby adjusting the middle catheter 2022 to a second target position.

S22: in response to a first middle catheter bending operation input by the user via the first middle catheter system operation button, the master console 410 sends a first middle catheter bending command to the surgical execution apparatus 320, such that the first middle catheter system driving assembly drives the first middle catheter system knob 2023 via the first middle catheter system transmission assembly 322202 to rotate, thereby adjusting the bending angle of the distal end of the middle catheter 2022 in the first direction to a second target bending angle. S23: in response to a second middle catheter bending operation input by the user via the second middle catheter system operation button, the master console 410 sends a second middle catheter bending command to the surgical execution apparatus 320, such that the second middle catheter system driving assembly drives the second middle catheter system knob 2024 via the second middle catheter system transmission assembly 322203 to rotate, thereby adjusting the bending angle of the distal end of the middle catheter 2022 in the second direction to a third target bending angle.

Specifically, for the middle catheter system 201, in order to drive it to perform a corresponding movement action, the master console 410 may send, in response to the middle catheter movement operation input by the user via the middle catheter system operation handle, the middle catheter movement command corresponding to the middle catheter movement operation to the surgical execution apparatus 320, where the middle catheter movement operation refers to an operation input by the user for the surgical execution apparatus 320 to move the middle catheter 2022, and the middle catheter movement command refers to a command sent by the master console 410 to the surgical drive device 3230 for driving the middle catheter 2022 to move. Since the third middle catheter driving assembly is configured to drive the surgical drive device 3230 to extend or retract and the middle catheter system 202 is disposed on the surgical drive device 3230, upon the surgical drive device 3230 receiving the middle catheter movement command, the surgical drive device 3230 may be driven by the third middle catheter driving assembly to extend or retract to drive the middle catheter system 202 to move, thereby adjusting the middle catheter 2022 to the second target position, where the second target position refers to a desired position that the middle catheter 2022 is expected to reach corresponding to the middle catheter movement operation.

For the middle catheter system 202, in order to drive it to perform a corresponding bending action in the first direction, the master console 410 may send, in response to the first middle catheter bending operation input by the user via the first middle catheter system operation button, the first middle catheter bending command corresponding to the first middle catheter bending operation to the surgical execution apparatus 320, where the first middle catheter bending operation refers to an operation input by the user via the first middle catheter system operation button for bending the middle catheter 2022 in the first direction, and the first middle catheter bending command refers to a command sent by the master console 410 to the surgical drive device 3230 for driving the middle catheter 2022 to bend in the first direction. Since the first middle catheter driving assembly of the surgical drive device 3230 is connected to the first middle catheter system knob 2023 configured to adjust the bending of the distal end of the middle catheter 2022 in the first direction, upon the surgical drive device 320 receiving the first middle catheter bending command, the first middle catheter driving assembly may drive the first middle catheter system knob 2023 to rotate, thereby adjusting the bending angle of the distal end of the middle catheter 2022 in the first direction to the second target bending angle, where the second target angle refers to a desired bending angle that the middle catheter 2022 is expected to achieve in the first direction corresponding to the first middle catheter bending operation.

For the middle catheter system 202, in order to drive it to perform a corresponding bending action in the second direction, the master console 410 may send, in response to the second middle catheter bending operation input by the user via the second middle catheter system operation button, the second middle catheter bending command corresponding to the second middle catheter bending operation to the surgical execution apparatus 320, where the second middle catheter bending operation refers to an operation input by the user via the second middle catheter system operation button for bending the middle catheter 2022 in the second direction, and the second middle catheter bending command refers to a command sent by the master console 410 to the surgical drive device 3230 for driving the middle catheter 2022 to bend in the second direction. Since the second middle catheter driving assembly of the surgical drive device 3230 is connected to the second middle catheter system knob 2024 configured to adjust the bending of the distal end of the middle catheter 2022 in the second direction, upon the surgical drive device 320 receiving the second middle catheter bending command, the second middle catheter driving assembly may drive the second middle catheter system knob 2024 to rotate, thereby adjusting the bending angle of the distal end of the middle catheter 2022 in the second direction to the third target bending angle, where the third target angle refers to a desired bending angle that the middle catheter 2022 is expected to achieve in the second direction corresponding to the second middle catheter bending operation.

In other words, the master console 410 is enabled to send, in response to the middle catheter movement operation, the first middle catheter bending operation, and the second middle catheter bending operation input by the user via the middle catheter system operation terminal of the master console 410 for the middle catheter system 202, the middle catheter movement command, the first middle catheter bending command and the second middle catheter bending command for the middle catheter system 202 to the surgical execution apparatus 320, such that the surgical drive device 3230 achieve the movement of the middle catheter 2022 and the bending in the first direction and the second direction according to the relevant commands respectively.

In a possible implementation, as shown in FIG. 5, the inner catheter system includes an inner catheter 2032, a first clamping element 204, a second clamping element 205, a clamping element locking rod 2033, a clamping element driving wheel 2034, a first clamping element lever 2035, a second clamping element lever 2036 and an inner catheter system handle 2031, where the inner catheter 2032 has a proximal end attached to the inner catheter system handle 2031, both the first clamping element 204 and the second clamping element 205 are disposed at the distal end of the inner catheter 2032, the clamping element locking rod 2033 is configured to control unlocking and locking of the first clamping element 204 located at the distal end of the inner catheter 2032, the clamping element driving wheel 2034 is configured to control opening and closing of the first clamping element 204, the first clamping element lever 2035 is configured to control lifting and capturing of the first capture arm of the second clamping element 205 located at the distal end of the inner catheter 2032, and the second clamping element lever 2036 is configured to control lifting and capturing of the second capture arm of the second clamping element 205.

Figure 27:
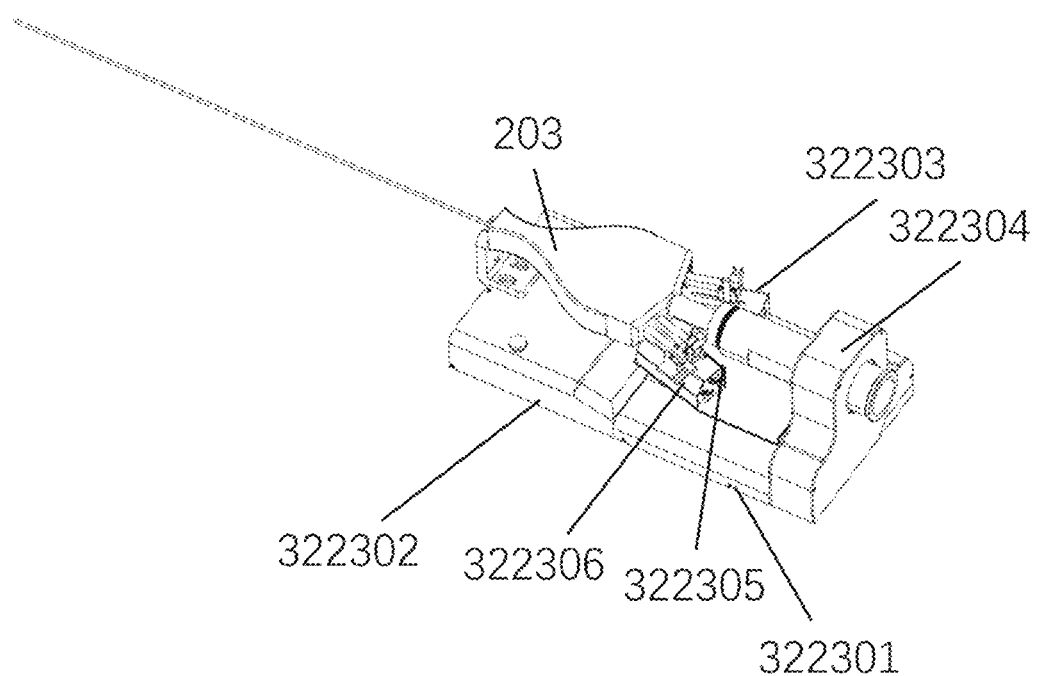
FIG. 27 is a schematic structural diagram of an inner catheter system supporting an inner catheter system in a first perspective view according to an embodiment of the present disclosure.
Figure 28:
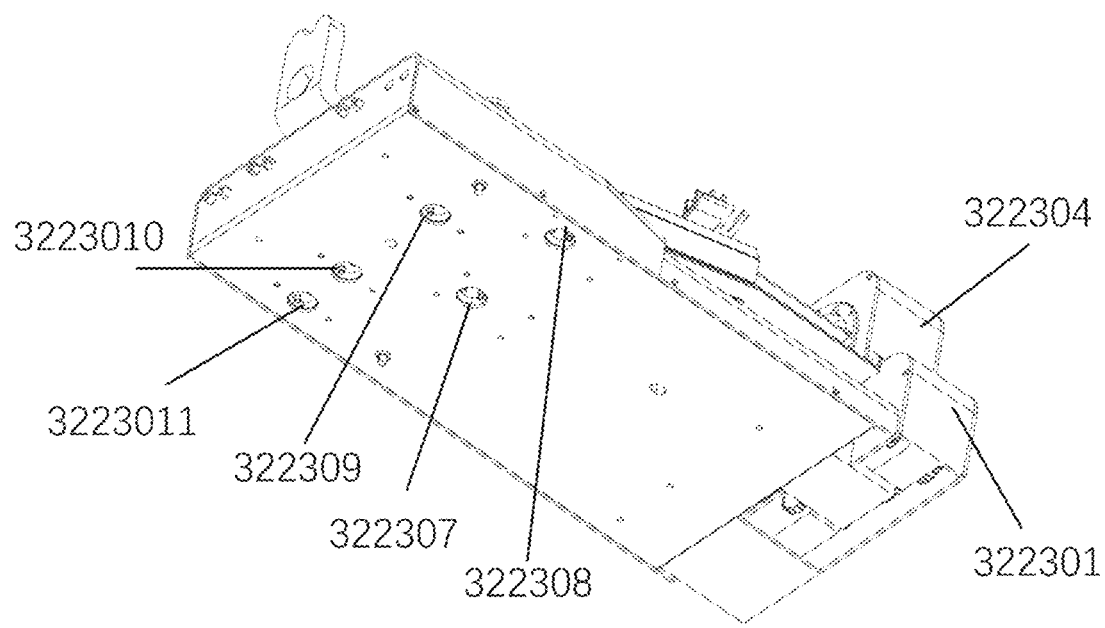
FIG. 28 is a schematic structural diagram of an inner catheter system adapter in a second perspective view according to an embodiment of the present disclosure.

As shown in FIGS. 27 and 28, the inner catheter system adapter 3223 may include an inner catheter system base 322301, an inner catheter rotation transmission assembly 322302, a clamping element locking rod transmission assembly 322303, a clamping element driving wheel transmission assembly 322304, a first clamping element lever transmission assembly 322305 and a second clamping element lever transmission assembly 322306, where the inner catheter rotation transmission assembly 322302 is disposed on the inner catheter system base 322301 and engaged with the inner catheter system handle 2031, and the clamping element locking rod transmission assembly 322303 is disposed on the inner catheter system base 322301 and engaged with the clamping element locking rod 2033, the clamping element driving wheel transmission assembly 322304 is disposed on the inner catheter system base 322301 and engaged with the clamping element driving wheel 2034, the first clamping element lever transmission assembly 322305 is disposed on the inner catheter system base 322301 and engaged with the first clamping element lever 2035, the second clamping element lever transmission assembly 322306 is disposed on the inner catheter system base 322301 and engaged with the second clamping element lever 2036. As shown in FIG. 27, the inner catheter system 301 may be carried on the inner catheter system adapter 3223.

The surgical drive device 3230 may include an inner catheter movement driving assembly, an inner catheter rotation driving assembly, a clamping element locking rod driving assembly, a clamping element driving wheel driving assembly, a first clamping element lever driving assembly, and a second clamping element lever driving assembly, where the inner catheter movement driving assembly is configured to extend or retract the surgical drive device 3230, the inner catheter rotation driving assembly is connected to the inner catheter rotation transmission assembly 322302, the clamping element locking rod driving assembly is connected to the clamping element locking rod transmission assembly 322303, the clamping element driving wheel driving assembly is connected to the clamping element driving wheel transmission assembly 322304, the first clamping element lever driving assembly is connected to the first clamping element lever transmission assembly 322305, and the second clamping element lever driving assembly is connected to the second clamping element lever transmission assembly 322306. As shown in FIG. 24, the fifth output shaft 32305, the sixth output shaft 32306, the seventh output shaft 32307, the eighth output shaft 32308 and the ninth output shaft 32309 of the surgical drive device 3230 may be configured to mate with the fifth input shaft 322307, the sixth input shaft 322308, the seventh input shaft 322309, the eighth input shaft 3223010 and the ninth input shaft 3223011 of the inner catheter system adapter 3223 respectively to achieve the connection between the inner catheter system adapter 3223 and the surgical drive device 3230. Moreover, the mounting surface of the surgical drive device 3230 is also designed with a positioning pin and a mounting fixing hole for facilitating the installation of the inner catheter system adapter 3223 onto the surgical drive device 3230.

The inner catheter system operation terminal includes a clamping element locking rod operation button, a clamping element driving wheel operation button, a first clamping element lever operation button, a second clamping element lever operation button and an inner catheter system operation handle.

S103 where the master console 410 sends, in response to the inner catheter system driving operation input by the user via the inner catheter system operation terminal, the inner catheter system driving command to the surgical execution apparatus 320, such that the surgical drive device 3230 drives the inner catheter system 203 via the inner catheter system adapter 3223 to perform an action corresponding to the inner catheter system driving operation includes the following operations.

S31: in response to an inner catheter movement operation input by the user via the inner catheter system operation handle, the master console 410 sends an inner catheter movement command to the surgical execution apparatus 320, such that the surgical drive device 3230 is driven by the inner catheter movement driving assembly to extend or retract to drive the inner catheter system 203 to move, thereby adjusting the inner catheter 2032 to a third target position.

S32: in response to an inner catheter rotation operation input by the user via the inner catheter system operation handle, the master console 410 sends an inner catheter rotation command to the surgical execution apparatus 320, such that the inner catheter rotation driving assembly drives the inner catheter system handle 2031 via the inner catheter rotation transmission assembly 322302 to rotate, thereby adjusting the bending direction of the distal end of the inner catheter 2032 to a second target bending direction.

S33: in response to a clamping element locking rod operation input by the user via the clamping element locking rod operation button, the master console 410 sends a clamping element locking rod operation command to the surgical execution apparatus 320, such that the clamping element locking rod driving assembly drives the clamping element locking rod 2033 via the clamping element locking rod transmission assembly 322303 to move, thereby controlling the first clamping element 204 to be locked or unlocked.

S34: in response to a clamping element driving wheel operation input by the user via the fixed element driving wheel operation button, the master console 410 sends a clamping element driving wheel operation command to the surgical execution apparatus 320, such that the clamping element driving wheel driving assembly drives the clamping element driving wheel 2034 via the clamping element driving wheel transmission assembly 322304 to rotate, thereby controlling the first clamping element 204 to be opened or closed.

S35: in response to a first clamping element lever operation input by the user via the first clamping element lever operation button, the master console 410 sends a first clamping element lever operation command to the surgical execution apparatus 320, such that the first clamping element lever driving assembly drives the first clamping element lever 2035 via the first clamping element lever transmission assembly 322305 to move, thereby controlling capturing or lifting of the first capture arm of the second clamping element 205.

S36: in response to a second clamping element lever operation input by the user via the second clamping element lever operation button, the master console 410 sends a second clamping element lever operation command to the surgical execution apparatus 320, such that the second clamping element lever driving assembly drives the second clamping element lever 2036 via the second clamping element lever transmission assembly 322306 to move, thereby controlling capturing or lifting of the second capture arm of the second clamping element 205.

In response to the clamping element lever operation input by the user via the first clamping element lever operation button or via the second clamping element lever operation button, the master console 410 sends a command to the surgical execution apparatus 320, such that the first and the second clamping element lever driving assemblies drive the first and second clamping element levers 2035 and 2036 via the first and second clamping element lever transmission assemblies 322305 and 322306 respectively to move, thereby controlling simultaneous capturing or lifting of the first and second capture arms of the second clamping element 205.

Specifically, for the inner catheter system 203, in order to drive it to perform a corresponding movement action, the master console 410 may send, in response to the inner catheter movement operation input by the user via the inner catheter system operation handle, the inner catheter movement command corresponding to the inner catheter movement operation to the surgical execution apparatus 320, where the inner catheter movement operation refers to an operation input by the user via the inner catheter system operation handle for moving the inner catheter 2032, and the inner catheter movement command refers to a command sent by the master console 410 to the surgical drive device 3230 for driving the inner catheter 2032 to move. Since the inner catheter movement driving assembly of the surgical drive device 3230 is configured to drive the surgical drive device 3230 to extend or retract and the inner catheter system 203 is disposed on the surgical drive device 3230, upon receiving the inner catheter movement command, the surgical drive device 3230 may be driven by the inner catheter movement driving assembly to extend or retract to drive the inner catheter system 203 to move, thereby adjusting the inner catheter 2032 to the third target position, where the third target position refers to a desired position that the inner catheter 2032 is expected to reach corresponding to the inner catheter movement operation.

For the inner catheter system 203, in order to drive it to perform a corresponding rotation action, the master console 410 may send, in response to the inner catheter rotation operation input by the user via the inner catheter system operation handle, the inner catheter rotation command corresponding to the inner catheter rotation operation to the surgical execution apparatus 320, where the inner catheter rotation operation refers to an operation input by the user via the inner catheter system operation handle for rotating the inner catheter 2032 to adjust the bending direction of the distal end of the inner catheter 2032, and the inner catheter rotation command refers to a command sent by the master console 410 to the surgical drive device 3230 for driving rotation of the inner catheter 2032 via the inner catheter system operation handle to adjust the bending direction of the distal end of the inner catheter 2032. Since the inner catheter rotation driving assembly of the surgical drive device 3230 is connected to the inner catheter system base 322301, upon the surgical drive device 3230 receiving the inner catheter rotation command, the inner catheter rotation driving assembly may drive the inner catheter system handle 2031 to rotate, thereby adjusting the bending direction of the distal end of the inner catheter 2032 to the second target bending direction, where the second target bending direction refers to a desired bending direction that the inner catheter is expected to achieve corresponding to the inner catheter rotation operation.

For the inner catheter system 203, in order to control it to be locked or unlocked, the master console 410 may send, in response to the clamping element locking rod operation input by the user via the clamping element locking rod operation button, the clamping element locking rod operation command to the surgical execution apparatus 320, where the clamping element locking rod operation refers to an operation input by the user via the clamping element locking rod operation button for the clamping element locking rod, and the clamping element locking rod operation command refers to a command sent by the master console 410 to the surgical execution apparatus 320 for driving the clamping element locking rod 2033 to move. Since the locking rod driving assembly is connected to the clamping element locking rod 2033 configured to control the locking state of the first clamping element 204, upon the surgical drive device 3230 receiving the clamping element locking rod operation command, the clamping element locking rod driving assembly may drive the clamping element locking rod 2033 via the clamping element locking rod transmission assembly 322303 to move, thereby controlling the first clamping element 204 to be locked or unlocked. It should be noted that only when the first clamping element 204 is unlocked can the subsequent clamping element driving wheel 2034 control the first clamping element 204 to be opened or closed, that is, when the first clamping element 204 is locked, its state remains unchanged.

For the inner catheter system 203, in order to control the first clamping element 204 to be opened or closed, the master console 410 may send, in response to the clamping element driving wheel operation input by the user via the clamping element driving wheel operation button, the clamping element driving wheel operation command to the surgical execution apparatus 320, where the clamping element driving wheel operation refers to an operation input via the clamping element driving wheel operation button for the clamping element driving wheel 2034, and the clamping element driving wheel operation command refers to a command sent by the master console 410 to the surgical execution apparatus 320 for driving the clamping element driving wheel 2034 to rotate. Since the clamping element driving wheel driving assembly of the surgical drive device 3230 is connected to the clamping element driving wheel 2034 configured to control the opening or closing of the first clamping element 204, upon the surgical drive device 3230 receiving the clamping element driving wheel operation command, the clamping element driving wheel driving assembly may drive the clamping element driving wheel 2034 via the clamping element driving wheel transmission assembly 322304 to rotate, thereby controlling the first clamping element 204 to be opened or closed. It should be noted that only when the first clamping element 204 is unlocked can the clamping element driving wheel 2034 control the first clamping element 204 to be opened or closed.

For the inner catheter system 203, in order to control the capturing or lifting of the first capture arm of the second clamping element 205, the master console 410 may send, in response to the first clamping element lever operation input by the user via the first clamping element lever operation button, the first clamping element lever operation command to the surgical execution apparatus 320, where the first clamping element lever operation refers to an operation input via the first clamping element lever operation button for the first clamping element lever 2035, and the first clamping element lever operation command refers to a command sent by the master console 410 to the surgical execution apparatus 320 for driving the first clamping element lever 2035 to move. Since the first clamping element lever driving assembly of the surgical drive device 3230 is connected to the first clamping element lever 2035 configured to control the capturing or lifting of the first capture arm of the second clamping element 205, upon the surgical drive device 3230 receiving the first clamping element lever operation command, the first clamping element lever driving assembly may drive the first clamping element lever 2035 via the first clamping element lever transmission assembly 322305 to move, thereby controlling the capturing or lifting of the first capture arm of the second clamping element 205.

For the inner catheter system 203, in order to control the capturing or lifting of the second capture arm of the second clamping element 205, the master console 410 may send, in response to the second clamping element lever operation input by the user via the second clamping element lever operation button, the second clamping element lever operation command to the surgical execution apparatus 320, where the second clamping element lever operation refers to an operation input via the second clamping element lever operation button for the second clamping element lever 2036, and the second clamping element lever operation command refers to a command sent by the master console 410 to the surgical execution apparatus 320 for moving the second clamping element lever 2036. Since the second clamping element lever driving assembly of the surgical drive device 3230 is connected to the second clamping element lever 2036 configured to control the capturing or lifting of the second capture arm of the second clamping element, upon the surgical drive device 3230 receiving the second clamping element lever 2036 operation command, the second clamping element lever driving assembly may drive the second clamping element lever 2036 via the second clamping element lever transmission assembly 322306 to move, thereby controlling the capturing or lifting of the second capture arm of the second clamping element 205.

For the inner catheter system 203, in addition to controlling the two capture arms of the second clamping element 205 to independently perform capturing, the two capture arms of the second clamping element 205 may also be controlled to simultaneously perform capturing. In response to the clamping element lever operation input by the user via the first clamping element lever operation button or via the second clamping element lever operation button, the master console 410 may send a command to the surgical execution apparatus 320, such that the first and second clamping element lever driving assemblies drive the first and second clamping element levers 2035 and 2036 via the first and second clamping element lever transmission assemblies 322305 and 322306 respectively to move, thereby controlling the first and second capture arms of the second clamping element 205 to perform capturing or lifting simultaneously.

In a possible implementation, as shown in FIG. 17, the robotic arm 310 may be configured to adjust the pose of the surgical execution apparatus 320, so the pose of the surgical execution apparatus 320 may be adjusted via the robotic arm 310 through relevant operations.

Figure 29:
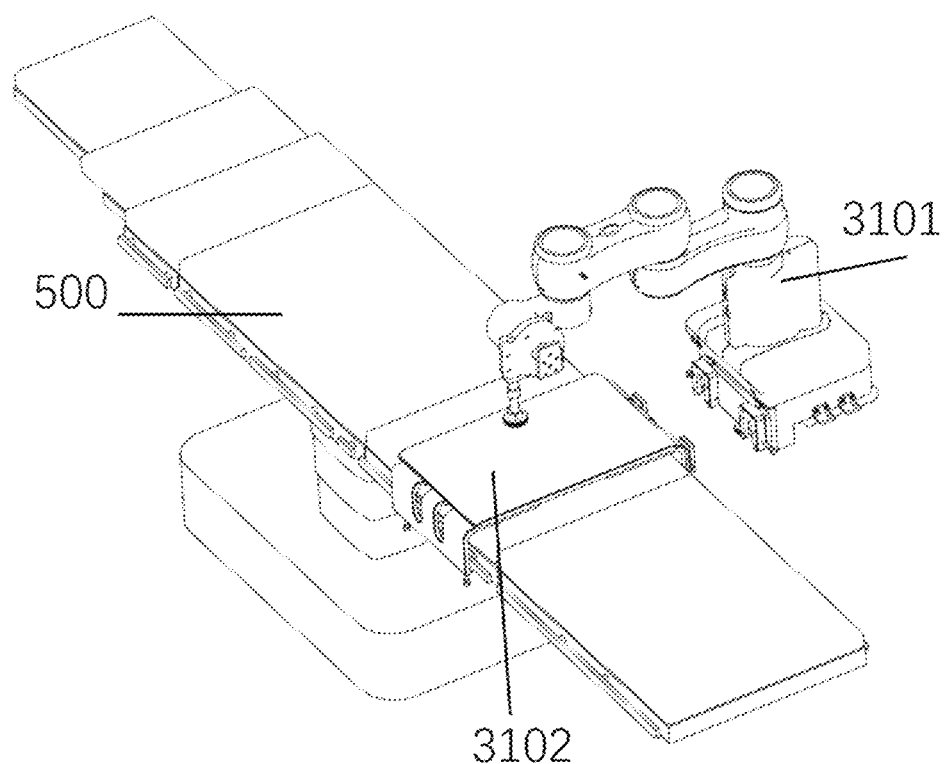
FIG. 29 is a schematic structural diagram of a robotic arm installed on a surgical bed according to an embodiment of the present disclosure.
Figure 30:
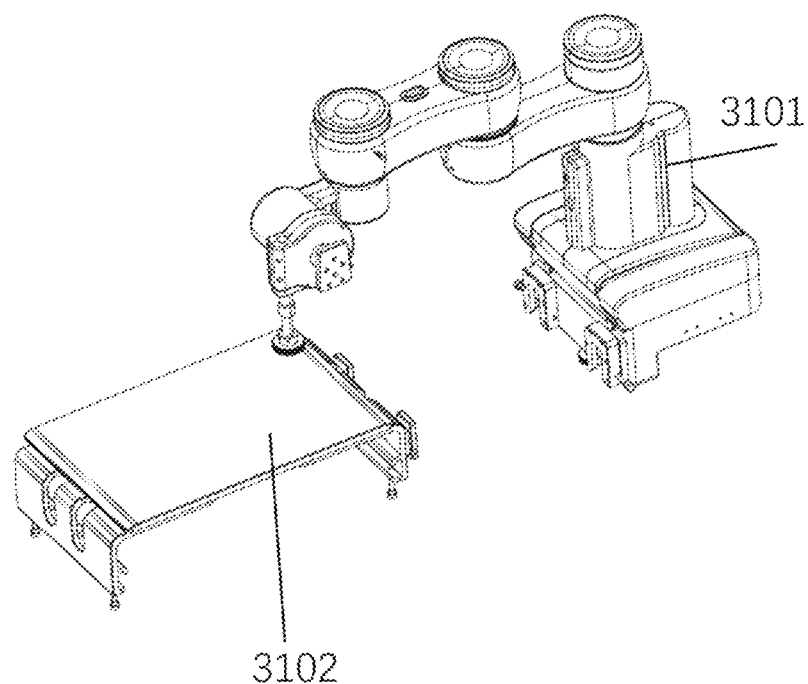
FIG. 30 is a schematic structural diagram of a robotic arm according to an embodiment of the present disclosure.
Figure 31:
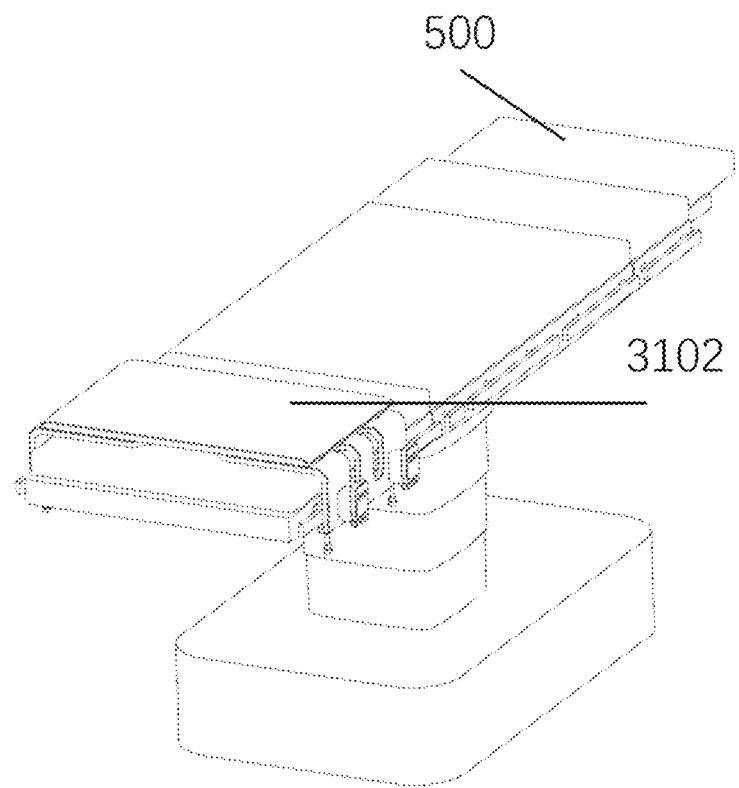
FIG. 31 is a schematic structural diagram of a medical bed connector installed on a surgical bed according to an embodiment of the present disclosure.
Figure 32:
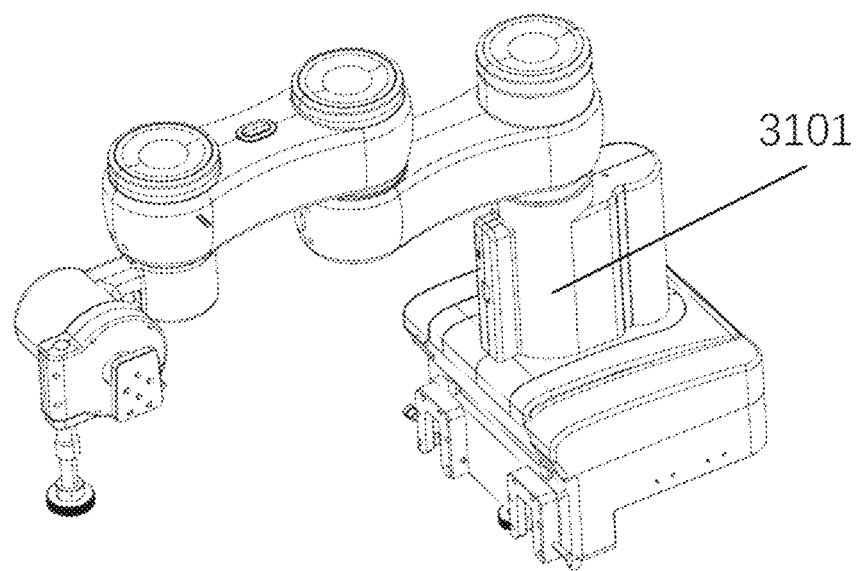
FIG. 32 is a schematic structural diagram of a robotic arm body according to an embodiment of the present disclosure.

The installation of the robotic arm 310 is described below. As shown in FIG. 29 and FIG. 30, the robotic arm 310 may be attached on the medical bed 500 and include a robotic arm body 3101 and a medical bed connector 3102. As shown in FIG. 31 and FIG. 32, during non-surgical period, the robotic arm body 3101 may be removed from the medical bed connector 3102 which may be retained on the medical bed 500 or removed and stored.

The medical bed connector 3102 includes a width adjustment assembly, a robotic arm body connection flange, and a height adjustment and fixing assembly. During installation, the width adjustment assembly and the height adjustment and fixing assembly may be adjusted first to make the installation dimensions of the medical bed connector 3102 in the width and height directions match the medical bed 500. In the matching state, the lower surface of the width adjustment assembly fits the upper surface of the medical bed 500, and the height adjustment and fixing assembly mates with the rails on both sides of the medical bed 500, and then the medical bed connector 3102 is reliably fixed to the medical bed 500 through the fastening mechanism on the height adjustment and fixing assembly. After the medical bed connector 3102 is installed in place, the flange on the robotic arm body 3101 is engaged with the robotic arm body connection flange on the connector 3102 of the medical bed 500 to achieve quick connection and fixation of the robotic arm 310 on the medical bed 500. Since the medical bed connector 3102 can be adjusted in both the width and height directions of the medical bed 500, it can be installed and used with medical beds 500 of different sizes.

In order to adjust the pose of the surgical execution apparatus 320 via the robotic arm 310, the operation terminal may include a robotic arm operation terminal including a first robotic arm operation button and a second robotic arm operation button.

S2101 where the master console 410 sends, in response to the pose adjustment operation input by the user via the operation terminal, the pose adjustment command to the robotic arm 310, such that the robotic arm 310 adjusts the pose of the surgical execution apparatus 320 to a pose corresponding to the pose adjustment operation according to the pose adjustment command includes:

in response to a vertical movement operation input by the user via the second robotic arm 310 operation button, sending, by the master console 410, a vertical movement command to the robotic arm 310, such that the robotic arm 310 controls the surgical execution apparatus 320 to be raised or lowered according to the vertical movement command.

Specifically, for the robotic arm 310, in order to control the surgical execution apparatus 320 to be raised or lowered via the robotic arm 310, the master console 410 may send, in response to the vertical movement operation input by the user via the second robotic arm operation button, the vertical movement command to the robotic arm 310, where the vertical movement operation refers to an operation input by the user via the second robotic arm operation button for controlling the vertical movement of the surgical execution apparatus 320 via the robotic arm 310, and the vertical movement command refers to a command sent by the master console 410 to the robotic arm 310 for controlling the vertical movement of the surgical execution apparatus 320 via the robotic arm 310. Upon receiving the vertical movement command, the robotic arm 310 may control the surgical execution apparatus 320 to be raised or lowered.

In a possible implementation, the control device 400 may further include a slave control touchscreen 323010 provided on the robotic device 300 and configured to control the robotic device 300. As shown in FIG. 24, the slave control touchscreen 323010 may be provided on one side of the surgical execution apparatus 320. The control method may further include the following operations.

S301: in response to a pose adjustment operation input by the user via the slave control touchscreen 323010, cause the slave control touchscreen 323010 to send a pose adjustment command to the robotic arm 310, such that the robotic arm 310 adjusts the pose of the surgical execution apparatus 320 to a pose corresponding to the pose adjustment operation according to the pose adjustment command.

S302, in response to a catheter system driving operation input by the user via the slave control touchscreen 323010, cause the slave control touchscreen 323010 to send a catheter system driving command to the surgical execution apparatus 320, such that the surgical drive device 3230 drives the catheter system 3210 via the sheath adapter 3220 to perform an action corresponding to the catheter system driving operation.

Specifically, for the surgical execution apparatus 320, in order to adjust the position and orientation of the surgical execution apparatus 320, the slave control touchscreen 323010 may send, in response to the pose adjustment operation input by the user via the operation terminal of the slave control touchscreen 323010, the pose adjustment command corresponding to the pose adjustment operation to the robotic arm 310, and upon receiving the pose adjustment command, the robotic arm 310 may adjust the pose of the surgical execution apparatus 320 according to the pose adjustment command.

After adjusting the pose of the surgical execution apparatus 320, for the catheter system 3210 on the surgical execution apparatus 320, in order to drive the it to perform a corresponding action, the slave control touchscreen 323010 may send, in response to the catheter system driving operation input by the user via the slave control touchscreen 323010, the catheter system driving command corresponding to the catheter system driving operation to the surgical execution apparatus 320, where the catheter system driving operation refers to an operation input by the user via the slave control touchscreen 323010 for actuating the catheter system 3210. Upon receiving the catheter system driving command, the surgical drive device 3230 may drive the catheter system 3210 via the sheath adapter 3220 to perform an action corresponding to the catheter system driving operation according to the catheter system driving command.

In other words, in this embodiment, in addition to the master control console 410, the slave control touchscreen 323010 may also be configured to adjust the pose of the surgical execution apparatus 320 and drive the catheter system 3210 to perform the action corresponding to the catheter system driving operation, that is, the slave control touchscreen 323010 enables auxiliary control of the surgical assistance system.

In a possible implementation, the control device 400 may further include a slave robotic arm locking button provided on the robotic device 300, and the control method may further include:

in response to a robotic arm operation input by the user via the slave robotic arm locking button, sending, by the control device 400, a robotic arm operation command to the robotic arm 310 to control locking or unlocking of a joint of the robotic arm 310.

Specifically, for the robotic arm 310, the control device 400 may send, in response to the robotic arm operation input by the user via the slave robotic arm locking button, the robotic arm operation command to the robotic arm 310. Upon receiving the robotic arm operation command, the robotic arm 310 may control the locking or unlocking of the joint of the robotic arm 310. When the joint of the robotic arm 310 is in a locked state, joint movement of the robotic arm 310 is disabled, thereby ensuring the stability and reliability of the robotic arm 310 and mitigating risks caused by unintended joint movement of the robotic arm 310.

In a possible implementation, in response to a horizontal movement operation input by the user via the slave robotic arm locking button, the control device 400 sends a horizontal movement command to the robotic arm 310, such that the robotic arm 310 controls the surgical execution apparatus 320 to move forward or backward according to the horizontal movement command.

Specifically, for the robotic arm 310, in order to control the surgical execution apparatus 320 to move forward or backward via the robotic arm 310, the control device 400 may send, in response to the horizontal movement operation input by the user via the slave robotic arm locking button, the horizontal movement command to the robotic arm 310, where the horizontal movement operation refers to an operation input by the user via the slave robotic arm locking button for controlling the horizontal movement of the surgical execution apparatus 320 via the robotic arm 310, and the horizontal movement command refers to a command sent by the control device 400 to the robotic arm 310 for controlling the horizontal movement of the surgical execution apparatus 320 via the robotic arm 310. Upon receiving the horizontal movement command, the robotic arm 310 may control the surgical execution apparatus 320 to move forward or backward.

In a possible implementation, in order to obtain a status information of the robotic device 300 in real time, the master console 410 may further include an information display operation button, and the control method may further include:

in response to an information display operation input by the user via the information display operation button, acquiring, by the master console 410, the status information of the robotic device 300;

splitting a display area of the display screen into a first sub-region and a second sub-region; and displaying the surgical image in the first sub-region and the status information in the second sub-region.

Specifically, in response to an information display operation input by the user via the information display operation button, the master console 410 may acquire the status information of the robotic device 300, which may include the pose of the robotic arm 310, the pose of the surgical execution apparatus 320, and the specific status of the catheter system included in the surgical execution apparatus 320.

After acquiring the status information of the robotic device 300, the display area of the display screen may be split into a first sub-region and a second sub-region, where the areas of the first and second sub-regions may be the same or different, which is not limited here. After the display area of the display screen is split, the surgical image may be displayed in the first sub-region, and the status information may be displayed in the second sub-region, that is, the surgical image and the status information may be displayed on the display screen at the same time.

In a possible implementation, the control device 400 may further include an enablement operation switch 420, which may be a foot switch as shown in FIG. 20, and the control method may further include:

in response to the enablement operation input by the user via the enablement operation switch 420, sending, by the control device 400, an enablement command to the robotic device 300, such that the control device 400 establishes a communication connection with the robotic device 300.

Specifically, in order to achieve stable control of the robotic device 300 via the control device 400, on the basis that the control device 400 includes the enablement operation switch 420, the control device 400 may send, in response to the enablement operation input by the user via the enablement operation switch 420, the enablement command to the robotic device 300 so as to establish a communication connection with the robotic device 300, that is, only when the robotic device 300 receives the enablement command can the control device 400 establish a communication connection with the robotic device 300.

In a possible implementation, the operation terminal may further include an emergency stop button, and the control method may further include:

in response to an emergency stop operation input by the user via the emergency stop button, sending, by the master console 410, an emergency stop command to the robotic device 300 so as to pause the robotic device 300.

Specifically, on the basis that the operation terminal includes an emergency stop button, the master console 410 may send, in response to the emergency stop operation input by the user via the emergency stop button, the emergency stop command corresponding to the emergency stop operation to the robotic device 300, so as to directly pause the robotic device 300, that is, the emergency stop button enables direct immediate cessation of the robotic device 300, thereby ensuring the safety of the surgical assistance system.

In a possible implementation, the operation terminal may further include a reset button, and the control method may further include:

in response to a reset operation input by the user via the reset button, sending, by the master console 410, a reset command to the robotic device 300, so as to reset the robotic device 300.

Specifically, on the basis that the operation terminal includes the reset button, the master console 410 may send, in response to the reset operation input by the user via the reset button, the reset command corresponding to the reset operation to the robotic device 300, so as to reset the robotic device 300. Resetting the robotic device 300 refers to controlling the robotic device 300 to return to an initial state, that is, the emergency stop button enables direct immediate cessation of the robotic device 300, thereby ensuring the safety of the surgical assistance system.

Figure 33:
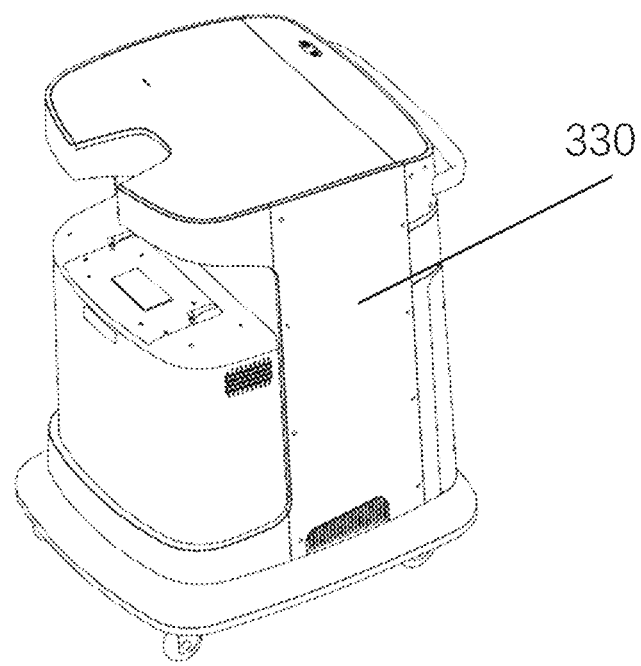
FIG. 33 is a schematic structural diagram of a medical cart according to an embodiment of the present disclosure.

In a possible implementation, the robotic device 300 may further include a medical cart 330 provided with a robotic arm storage compartment and a robotic arm fixation interface adapted for the robotic arm 310, where the medical cart 330 is communicatively connected to the control device 400. As shown in FIG. 33, the medical cart 330 is provided with a robotic arm storage compartment and a robotic arm fixation interface, where the robotic arm 310 may be received within the medical cart 330 during non-surgical period, the control method may further include the following operations.

S401: in response to the robotic arm transfer operation input by the user via the control device 400, the control device 400 sends a robotic arm transfer command to the medical cart 330, such that the medical cart 330 moves to transfer the robotic arm 310 to a fourth target position.

S402: in response to a robotic arm installation operation input by the user via the control device 400, the control device 400 sends a robotic arm installation command to the medical cart 330, such that fixation of the robotic arm 310 to the medical cart 330 is released for installation of the robotic arm 310 onto the medical bed 500.

Specifically, when the robotic arm 310 is relatively heavy and difficult to be installed and removed, the medical cart 330 may be configured to assist in the installation and removal of the robotic arm 310. When the robotic arm 310 is secured to the medical cart 330, the control device 400 may send, in response to the robotic arm transfer operation input by the user via the control device 400, the robotic arm transfer command to the medical cart 330, such that the medical cart 330 moves to transfer the robotic arm 310 to the fourth target position, where the robotic arm transfer operation refers to an operation input by the user via the control device 400 for the medical cart 330 to transfer the robotic arm 310 by moving, the robotic arm transfer command refers to a command sent by the control device 400 to the medical cart 330 for instructing it to move to transfer the robotic arm 310, and the fourth target position refers to a position where the robotic arm 310 can be installed on the medical bed 500.

Figure 34:
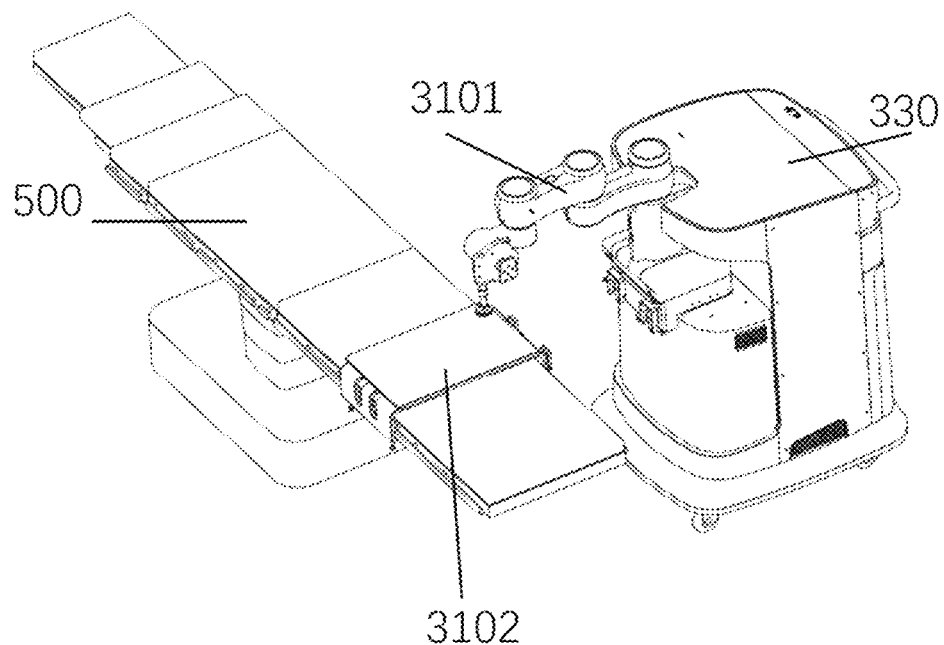
FIG. 34 is a schematic structural diagram of a medical cart with a robotic arm installed thereon according to an embodiment of the present disclosure.

After the robotic arm 310 reaches the fourth target position, as shown in FIG. 34, the control device 400 may send, in response to the robotic arm installation operation input by the user via the control device 400, the robotic arm installation command to the medical cart 330, where the robotic arm installation operation refers to an operation input by the user via the control device 400 for releasing the fixation of the robotic arm 310 to the medical cart 330 so as to install the robotic arm 310 to the medical bed 500, and the robotic arm installation command refers to a command sent by the control device 400 to the medical cart 330 to release the fixation of the robotic arm 310 to the medical cart 330 so as to install the robotic arm 310 to the medical bed 500. Upon receiving the robotic arm installation command, the medical cart 330 may release the fixation of the robotic arm 310 for installing the robotic arm 310 to the medical bed 500.

It should be noted that if the medical cart 330 is desired to assist in the removal of the robotic arm 310, the above steps may be performed in reverse order, that is, the control device 400 may send first, in response to a robotic arm release operation input by the user via the control device 400, a robotic arm release command to the medical cart 330, such that the medical cart 330 fixates the robotic arm 310 disposed on the medical bed 500, and then the control device 400 may send, in response to a robotic arm detachment operation input by the user via the control device 400, a robotic arm detachment command to the medical cart 330, such that the medical cart 330 moves to detach the robotic arm 310 secured to the medical cart 330 from the medical bed 500.

In summary, the present disclosure provides a control method for a surgical assistance system including a robotic device 300 and a control device 400, where the robotic device 300 includes a robotic arm 310 and a surgical execution apparatus 320 disposed at the distal end of the robotic arm 310, the robotic arm 310 being configured to adjust the pose of the surgical execution apparatus 320; the surgical execution apparatus 320 including a catheter system 3210, a sheath adapter 3220 and a surgical drive device 3230, the sheath adapter 3220 being connected to the surgical drive device 3230 and configured to support the catheter system 3210, and the surgical drive device 3230 being configured to actuate the catheter system 3210 via the sheath adapter 3220; and the control device 400 includes a master console 410 including an operation terminal and a display screen, the operation terminal being configured to control the robotic device 300, and the display screen being configured to display the surgical image. The control method includes: in response to a pose adjustment operation input by a user based on an operation terminal, sending, by the master console 410, a pose adjustment command to the robotic arm 310, such that the robotic arm 310 adjusts the pose of the surgical execution apparatus 320 to a pose corresponding to the pose adjustment operation according to the pose adjustment command; and in response to a catheter system driving operation input by the user via an operation terminal, sending, by the master console 410, a catheter system driving command to the surgical execution apparatus 320, such that the surgical drive device 3230 drives the catheter system 3210 via the sheath adapter 3220 to perform an action corresponding to the catheter system driving operation.

The above control method enables the master console 410 to send, in response to relevant operations input by the user via the operation terminal of the master console 410, corresponding commands to the robotic device 300, such that the robotic arm 310 adjusts the pose of the surgical execution apparatus 320 according to the pose adjustment command and drives the catheter system 3210 via the sheath adapter 3220 to perform a corresponding action according to the catheter system driving command, which achieves semi-automatic control of the surgical assistance system, thereby eliminating surgeons' complex manual manipulation of the catheter system and in turn the procedural difficulty, while shortening surgeons' learning curves, thus facilitating the clinical deployment of the surgical assistance system.

In the description of this specification, references to the terms such as "some possible embodiments", "some embodiments", "example", "specific example", or "some examples" mean that the specific features, structures, materials or characteristics described in connection with such embodiments or examples are included in at least one embodiment or example of the present disclosure, while these terms do not necessarily refer to the same embodiment or example. Moreover, the described specific features, structures, materials or characteristics may be combined in any one or more embodiments or examples in any suitable manner. In addition, without contradiction, a person skilled in the art may combine and integrate the different embodiments or examples described in this specification as well as the features of the different embodiments or examples.

Regarding the flowchart of the embodiment of the present disclosure, certain operations are described as different steps performed in a certain order. Such a flow chart is illustrative rather than restrictive. Certain steps described herein may be grouped together and performed in a single operation, or certain steps may be divided into multiple sub-steps, and certain steps may be performed in an order different from that shown herein. The various steps shown in the flowchart may be implemented in any way by any circuit structure and/or tangible mechanism (for example, by software running on a computing device, hardware (for example, a logical function implemented by a processor or chip), etc., and/or any combination thereof).

A person skilled in the art may understand that in the method described in the above specific embodiment, the recitation order of each step does not mean a strict execution order, and the specific execution order of each step should be determined by its function and possible internal logic.

Figure 35:
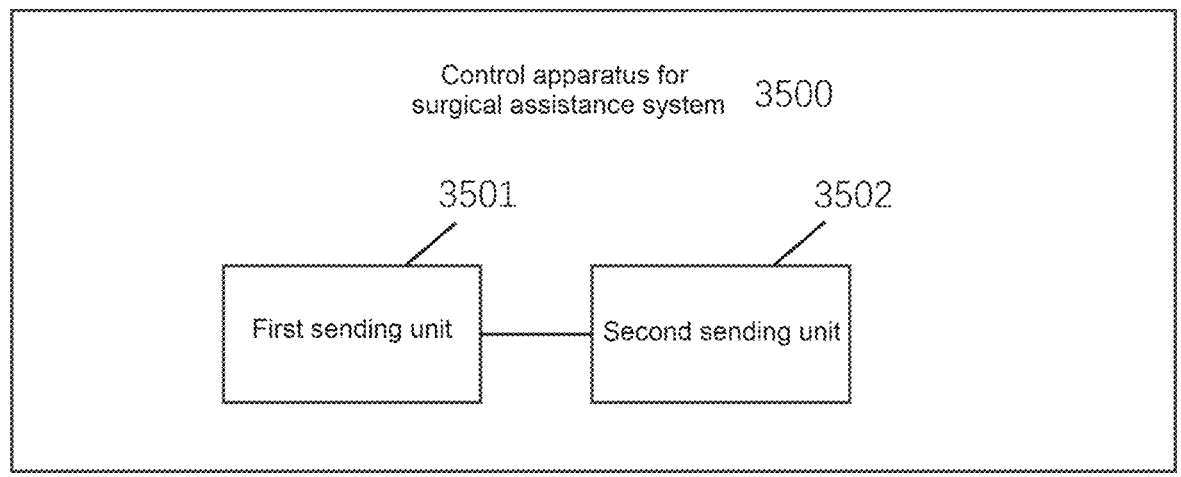
FIG. 35 is a schematic diagram of a control apparatus for a surgical assistance system according to an embodiment of the present disclosure.

Based on the aforementioned FIGS. 1 to 34, the following apparatus embodiments are provided to illustrate a control apparatus for a surgical assistance system according to the present disclosure. As shown in FIG. 35, the control apparatus 3500 for a surgical assistance system includes:

a first sending unit 3501 configured to, in response to a pose adjustment operation input by a user via the operation terminal, cause the master console 410 to send a pose adjustment command to the robotic arm 310, such that the robotic arm 310 adjusts the pose of the surgical execution apparatus 320 to a pose corresponding to the pose adjustment operation according to the pose adjustment command;

a second sending unit 3502 configured to, in response to a catheter system driving operation input by the user via the operation terminal, cause the master console 410 to send a catheter system driving command to the surgical execution apparatus 320, such that the surgical drive device 3230 drives the catheter system 3210 via the sheath adapter 3220 to perform an action corresponding to the catheter system driving operation.

In a possible implementation, the second sending unit 3502 is configured to:

in response to an outer catheter system driving operation input by the user via the outer catheter system operation terminal, cause the master console 410 to send an outer catheter system driving command to the surgical execution apparatus 320, such that the surgical drive device 3230 drives the outer catheter system 201 via the outer catheter system adapter 3221 to perform an action corresponding to the outer catheter system driving operation;

in response to a middle catheter system driving operation input by the user via the middle catheter system operation terminal, cause the master console 410 to send a middle catheter system driving command to the surgical execution apparatus 320, such that the surgical drive device 3230 drives the middle catheter system 202 via the middle catheter system adapter 3222 to perform an action corresponding to the middle catheter system driving operation; and in response to an inner catheter system driving operation input by the user via the inner catheter system operation terminal, cause the master console 410 to send an inner catheter system driving command to the surgical execution apparatus 320, such that the surgical drive device 3230 drives the inner catheter system 203 via the inner catheter system adapter 3223 to perform an action corresponding to the inner catheter system driving operation.

In a possible implementation, the second sending unit 3502 is configured to:

in response to an outer catheter movement operation input by the user via the outer catheter system operation handle or the outer catheter system operation button, cause the master console 410 to send an outer catheter movement command to the surgical execution apparatus 320, such that the surgical execution apparatus 320 is driven by the third outer catheter driving assembly to extend or retract to drive the outer catheter system 201 to move, thereby adjusting the outer catheter 2012 to a first target position;

in response to an outer catheter bending operation input by the user via the outer catheter system operation button, cause the master console 410 to send an outer catheter bending command to the surgical execution apparatus 320, such that the first outer catheter driving assembly drives the outer catheter system knob 2013 via the first outer catheter system transmission assembly 322102 to rotate, thereby adjusting a bending angle of the distal end of the outer catheter 2012 to a first target bending angle; and in response to an outer catheter rotation operation input by the user via the outer catheter system operation handle, cause the master console 410 to send an outer catheter rotation command to the surgical execution apparatus 320, such that the second outer catheter driving assembly drives the outer catheter system handle 2011 via the second outer catheter system transmission assembly 322103 to rotate, thereby adjusting a bending direction of the distal end of the outer catheter 2012 to a first target bending direction.

In a possible implementation, the second sending unit 3502 is configured to:

in response to a middle catheter movement operation input by the user via the middle catheter operation handle, cause the master console 410 to send a middle catheter movement command to the surgical execution apparatus 320, such that the third middle catheter system driving assembly drives the middle catheter system 202 by telescoping the surgical execution apparatus 320 to move, thereby adjusting the middle catheter 2022 to a second target position;

in response to a first middle catheter bending operation input by the user via the first middle catheter system operation button, cause the master console 410 to send a first middle catheter bending command to the surgical execution apparatus 320, such that the first middle catheter system driving assembly drives the first middle catheter system knob 2023 via the first middle catheter system transmission assembly 322202 to rotate, thereby adjusting the bending angle of the distal end of the middle catheter 2022 in the first direction to a second target bending angle; and in response to a second middle catheter bending operation input by the user via the second middle catheter system operation button, cause the master console 410 to send a second middle catheter bending command to the surgical execution apparatus 320, such that the second middle catheter system driving assembly drives the second middle catheter system knob 2024 via the second middle catheter system transmission assembly 322203 to rotate, thereby adjusting a bending angle of the distal end of the middle catheter 2022 in the second direction to a third target bending angle.

In a possible implementation, the second sending unit 3502 is configured to:

in response to an inner catheter movement operation input by the user via the inner catheter system operation handle, cause the master console 410 to send an inner catheter movement command to the surgical execution apparatus 320, such that the surgical execution apparatus 320 is driven by the inner catheter movement driving assembly to retract to drive the inner catheter system 203 to move, thereby adjusting the inner catheter 2032 to a third target position;

in response to an inner catheter rotation operation input by the user via the inner catheter system operation handle, cause the master console 410 to send an inner catheter rotation command to the surgical execution apparatus 320, such that the inner catheter rotation driving assembly drives the inner catheter system handle 2031 via the inner catheter rotation transmission assembly 322302 to rotate, thereby adjusting a bending direction of the distal end of the inner catheter 2032 to a second target bending direction;

in response to a clamping element locking rod operation input by the user via the clamping element locking rod operation button, cause the master console 410 to send a clamping element locking rod operation command to the surgical execution apparatus 320, such that the clamping element locking rod driving assembly drives the clamping element locking rod 2033 via the clamping element locking rod transmission assembly 322303 to move, thereby controlling the first clamping element 204 to be locked or unlocked;

in response to a clamping element driving wheel operation via the clamping element driving wheel operation button by the user, cause the master console 410 to send a clamping element driving wheel operation command to the surgical execution apparatus 320, such that the clamping element driving wheel driving assembly drives the clamping element driving wheel 2034 via the clamping element driving wheel transmission assembly 322304 to rotate, thereby controlling the first clamping element 204 to be opened or closed;

in response to a first clamping element lever operation input by the user via the first clamping element lever operation button, cause the master console 410 to send a first clamping element lever operation command to the surgical execution apparatus 320, such that the first clamping element lever driving assembly drives the first clamping element lever 2035 via the first clamping element lever transmission assembly 322305 to move, thereby controlling capturing or lifting of the first capture arm of the second clamping element;

in response to a second clamping element lever operation input by the user via the second clamping element lever operation button, cause the master console 410 to send a second clamping element lever operation command to the surgical execution apparatus 320, such that the second clamping element lever driving assembly drives the second clamping element lever 2036 via the second clamping element lever transmission assembly 322306 to move, thereby controlling capturing or lifting of the second capture arm of the second clamping element 205; and in response to a clamping element lever operation input by the user via the first clamping element lever operation button, or in response to a clamping element lever operation input by the user via the second clamping element lever operation button, cause the master console 410 to send a command to the surgical execution apparatus 320, such that the first and second clamping element lever driving assemblies drive the first and second clamping element levers 2035 and 2036 via the first and second clamping element lever transmission assemblies 322305 and 322306 respectively to move, thereby controlling simultaneous capturing or lifting of the first and second capture arms of the second clamping element 205.

In a possible implementation, the first sending unit 3501 is configured to:

in response to a vertical movement operation input by the user via the second robotic arm operation button, cause the master console 410 to send a vertical movement command to the robotic arm 310, such that the robotic arm 310 controls the surgical execution apparatus 320 to be raised or lowered according to the vertical movement command.

In a possible implementation, the first sending unit 3501 is further configured to:

in response to a pose adjustment operation input by the user via the slave control touchscreen 323010, cause the slave control touchscreen 323010 to send a pose adjustment command to the robotic arm 310, such that the robotic arm 310 adjusts the pose of the surgical execution apparatus 320 to a pose corresponding to the pose adjustment operation according to the pose adjustment command; and in response to a catheter system driving operation input by the user via the slave control touchscreen 323010, cause the slave control touchscreen 323010 to send a catheter system driving command to the surgical execution apparatus 320, such that the surgical drive device 3230 drives the catheter system 3210 via the sheath adapter 3220 to perform an action corresponding to the catheter system driving operation.

In a possible implementation, the first sending unit 3501 is further configured to:

in response to a robotic arm operation input by the user via the slave robotic arm locking button, cause the control device 400 to send a robotic arm operation command to the robotic arm 310 to control locking or unlocking of a joint of the robotic arm 310.

In a possible implementation, the first sending unit 3501 is further configured to:

in response to a horizontal movement operation input by the user via the slave robotic arm locking button, cause the control device 400 to send a horizontal movement command to the robotic arm 310, such that the robotic arm 310 controls the surgical execution apparatus 320 to move forward or backward according to the horizontal movement command.

In a possible implementation, the control device further includes an acquisition unit configured to:

in response to an information display operation input by the user via the information display operation button, cause the master console 410 to acquire status information of the robotic device 300;

split a display area of the display screen into a first sub-region and a second sub-region; and display the surgical image in the first sub-region and the status information in the second sub-region.

In a possible implementation, the first sending unit 3501 is further configured to:

in response to an enablement operation input by the user via the enablement operation switch 420, cause the control device 400 to send an enablement command to the robotic device 300, such that the control device 400 establishes a communication connection with the robotic device 300.

In a possible implementation, the first sending unit 3501 is further configured to:

in response to an emergency stop operation input by the user via the emergency stop button, cause the master console 410 to send an emergency stop command to the robotic device 300 so as to pause the robotic device 300.

In a possible implementation, the first sending unit 3501 is further configured to: in response to a reset operation input by the user via the reset button, cause the master console 410 to send a reset command to the robotic device 300 so as to reset the robotic device 300.

In a possible implementation, the first sending unit 3501 is further configured to:

in response to a robotic arm transfer operation input by the user via the control device 400, cause the control device 400 to send a robotic arm transfer command to the medical cart 330, such that the medical cart 330 moves to transfer the robotic arm 310 to a fourth target position;

in response to a robotic arm installation operation input by the user via the control device 400, cause the control device 400 to send a robotic arm installation command to the medical cart 330, such that fixation of the robotic arm 310 to the medical cart 330 is released for installation of the robotic arm 310 onto the medical bed 500.

It should be noted that the apparatus in embodiments of the present disclosure can implement each process in embodiments of the aforementioned method and achieve the same effect and function, which will not be repeated here.

Embodiments of the present disclosure also provide an electronic device including a processor, a memory and a bus, where the memory has stored therein machine-readable instructions executable by the processor, and when the electronic device operates, the processor communicates with the memory. The machine-readable instructions, when executed by the processor, cause the following processing to be performed:

in response to a pose adjustment operation input by the user via the operation terminal, causing the master console 410 to send a pose adjustment command to the robotic arm 310, such that the robotic arm 310 adjusts the pose of the surgical execution apparatus 320 to a pose corresponding to the pose adjustment operation according to the pose adjustment command; and in response to a catheter system driving operation input by the user via the operation terminal, causing the master console 410 to send a catheter system driving command to the surgical execution apparatus 320, such that the surgical drive device 3230 drives the catheter system 3210 via the sheath adapter 3220 to perform an action corresponding to the catheter system driving operation.

Embodiments of the present disclosure also provide a computer-readable storage medium having a computer program stored thereon. The computer program, when executed by a processor, causes the steps of the control method for the surgical assistance system described in the above method embodiments to be implemented. The storage medium may be a volatile or non-volatile computer-readable storage medium.

Embodiments of the present disclosure also provide a computer program product including a computer program. The computer program product carries a program code, and the instructions included in the program code may be configured to cause the steps of the control method for a surgical assistance system described in the above method embodiments to be implemented. References to the above method embodiments may be made for details, which will not be repeated here.

The above computer program product may be implemented in hardware, software or a combination thereof. In an optional embodiment, the computer program product is specifically embodied as a computer storage medium, and in another optional embodiment, the computer program product is specifically embodied as a software product, such as a software development kit (Software Development Kit, SDK), etc.

Each embodiment in the present disclosure is described in a progressive manner, and the same or similar parts between the various embodiments may be referred to each other, and each embodiment focuses on the differences from other embodiments. In particular, for the apparatus, device and computer-readable storage medium embodiments, since they are basically similar to the method embodiments, their descriptions are simplified, and the partial description of the method embodiments may be referred to for the relevant parts.

Although the spirit and principle of the present disclosure have been described with reference to several specific embodiments above, it should be understood that the present disclosure is not limited to the disclosed specific embodiments, and the division of various aspects does not mean that the features in these aspects cannot be combined. The present disclosure is intended to cover various modifications and equivalent arrangements included within the spirit and scope of the appended claims.

What is claimed is:

1. A control method for a surgical assistance system, the surgical assistance system comprising a robotic device (300) and a control device (400);

the robotic device (300) comprising a robotic arm (310) and a surgical execution apparatus (320) disposed at a distal end of the robotic arm (310), the robotic arm (310) being configured to adjust a pose of the surgical execution apparatus (320), the surgical execution apparatus (320) comprising a catheter system (3210), a sheath adapter (3220) and a surgical drive device (3230), the sheath adapter (3220) being connected to the surgical drive device (3230) and configured to support the catheter system (3210), and the surgical drive device (3230) being configured to actuate the catheter system (3210) via the sheath adapter (3220);

the control device (400) comprising a master console (410) that comprises an operation terminal and a display screen, the operation terminal being configured to control the robotic device (300), and the display screen being configured to display a surgical image;

wherein the control method comprises:

in response to a pose adjustment operation input by a user via the operation terminal, sending, by the master console (410), a pose adjustment command to the robotic arm (310), such that the robotic arm (310) adjusts the pose of the surgical execution apparatus (320) to a pose corresponding to the pose adjustment operation according to the pose adjustment command; and in response to a catheter system driving operation input by the user via the operation terminal, sending, by the master console (410), a catheter system driving command to the surgical execution apparatus (320), such that the surgical drive device (3230) drives the catheter system (3210) via the sheath adapter (3220) to perform an action corresponding to the catheter system driving operation, wherein the catheter system (3210) comprises an inner catheter system (203); the sheath adapter (3220) comprises an inner catheter system adapter (3223), the inner catheter system adapter (3223) being configured to support the inner catheter system (203); and the operation terminal comprises an inner catheter system operation terminal;

the inner catheter system (203) comprises an inner catheter (2032), a first clamping element (204), a second clamping element (205), a clamping element locking rod (2033), a clamping element driving wheel (2034), a first clamping element lever (2035), a second clamping element lever (2036) and an inner catheter system handle (2031), the inner catheter (2032) having a proximal end attached to the inner catheter system handle (2031), the clamping element locking rod (2033) being configured to control unlocking and locking of the first clamping element (204) located at a distal end of the inner catheter (2032), the clamping element driving wheel (2034) being configured to control opening and closing of the first clamping element (204), the first clamping element lever (2035) being configured to control lifting and capturing of a first capture arm of the second clamping element (205) located at the distal end of the inner catheter (2032), and the second clamping element lever (2036) being configured to control lifting and capturing of a second capture arm of the second clamping element (205);

the inner catheter system adapter (3223) comprises an inner catheter system base (322301), an inner catheter rotation transmission assembly (322302), a clamping element locking rod transmission assembly (322303), a clamping element driving wheel transmission assembly (322304), a first clamping element lever transmission assembly (322305) and a second clamping element lever transmission assembly (322306), the inner catheter rotation transmission assembly (322302) being disposed on the inner catheter system base (322301) and engaged with the inner catheter system handle (2031), the clamping element locking rod transmission assembly (322303) being disposed on the inner catheter system base (322301) and engaged with the clamping element locking rod (2033), the clamping element driving wheel transmission assembly (322304) being disposed on the inner catheter system base (322301) and engaged with the clamping element driving wheel (2034), the first clamping element lever transmission assembly (322305) being disposed on the inner catheter system base (322301) and engaged with the second clamping element lever (2035), and the second clamping element lever transmission assembly (322306) being disposed on the inner catheter system base (322301) and engaged with the second clamping element lever (2036);

the surgical drive device comprises an inner catheter movement driving assembly, an inner catheter rotation driving assembly, a clamping element locking rod driving assembly, a clamping element driving wheel driving assembly, a first clamping element lever driving assembly and a second clamping element lever driving assembly, the inner catheter movement driving assembly being configured to drive the surgical drive device (3230) to extend or retract, the inner catheter rotation driving assembly being connected to the inner catheter rotation transmission assembly (322302), the clamping element locking rod driving assembly being connected to the clamping element locking rod transmission assembly (322303), the clamping element driving wheel driving assembly being connected to the clamping element driving wheel transmission assembly (322304), the first clamping element lever driving assembly being connected to the first clamping element lever transmission assembly (322305), and the second clamping element lever driving assembly being connected to the second clamping element lever transmission assembly (322306);

the inner catheter system operation terminal comprises a clamping element locking rod operation button, a clamping element driving wheel operation button, a first clamping element lever operation button, a second clamping element lever operation button and an inner catheter system operation handle; and in response to the catheter system driving operation input by the user via the operation terminal, sending, by the master console (410), the catheter system driving command to the surgical execution apparatus (320), such that the surgical drive device (3230) drives the catheter system (3210) via the sheath adapter (3220) to perform an action corresponding to the catheter system driving operation comprises:

in response to an inner catheter movement operation input by the user via the inner catheter system operation handle, sending, by the master console (410), an inner catheter movement command to the surgical execution apparatus (320), such that the surgical drive device (3230) is driven by the inner catheter movement driving assembly to extend or retract to drive the inner catheter system (203) to move, thereby adjusting the inner catheter (2032) to a third target position;

in response to an inner catheter rotation operation input by the user via the inner catheter system operation handle, sending, by the master console (410), an inner catheter rotation command to the surgical execution apparatus (320), such that the inner catheter system handle (2031) is driven by the inner catheter rotation driving assembly via the inner catheter rotation transmission assembly (322302) to rotate, thereby adjusting a bending direction of the distal end of the inner catheter (2032) to a second target bending direction;

in response to a clamping element locking rod operation input by the user via the clamping element locking rod (2033) operation button, sending, by the master console (410), a clamping element locking rod operation command to the surgical execution apparatus (320), such that the clamping element locking rod (2033) is driven by the clamping element locking rod driving assembly via the clamping element locking rod transmission assembly (322303) to move, thereby controlling the first clamping element (204) to be locked or unlocked;

in response to a clamping element driving wheel operation input by the user via the clamping element driving wheel operation button, sending, by the master console (410), a clamping element driving wheel operation command to the surgical execution apparatus (320), such that the clamping element driving wheel (2034) is driven by the clamping element driving wheel driving assembly via the clamping element driving wheel transmission assembly (322304) to rotate, thereby controlling the first clamping element (204) to be opened or closed;

in response to a first clamping element lever operation input by the user via the first clamping element lever operation button, sending, by the master console (410), a first clamping element lever operation command to the surgical execution apparatus (320), such that the first clamping element lever (2035) is driven by the first clamping element lever driving assembly via the first clamping element lever transmission assembly (322305) to move, thereby controlling capturing or lifting of the first capture arm of the second clamping element (205);

in response to a second clamping element lever operation input by the user via the second clamping element lever operation button, sending, by the master console (410), a second clamping element lever operation command to the surgical execution apparatus (320), such that the second clamping element lever (2036) is driven by the second clamping element lever driving assembly via the second clamping element lever transmission assembly (322306) to move, thereby controlling capturing or lifting of the second capture arm of the second clamping element (205); and in response to a clamping element lever operation input by the user via the first clamping element lever operation button, or in response to a clamping element lever operation input by the user via the second clamping element lever operation button, sending, by the master console (410), a command to the surgical execution apparatus (320), such that the first clamping element lever (2035) and the second clamping element lever (2036) are driven by the first clamping element lever driving assembly and the second clamping element lever driving assembly via the first clamping element lever transmission assembly (322305) and the second clamping element lever transmission assembly (322306) to move respectively, thereby controlling simultaneous capturing or lifting of the first capture arm and the second capture arm of the second clamping element (205).

2. The control method according to claim 1, wherein the catheter system (3210) further comprises an outer catheter system (201), a middle catheter system (202); the sheath adapter (3220) further comprises an outer catheter system adapter (3221), and a middle catheter system adapter (3222), the outer catheter system adapter (3221) being configured to support the outer catheter system (201), and the middle catheter system adapter (3222) being configured to support the middle catheter system (202), and the operation terminal further comprises an outer catheter system operation terminal and a middle catheter system operation terminal; and in response to the catheter system driving operation input by the user via the operation terminal, sending, by the master console (410), the catheter system driving command to the surgical execution apparatus (320), such that the surgical drive device (3230) drives the catheter system (3210) via the sheath adapter (3220) to perform an action corresponding to the catheter system driving operation further comprises:

in response to an outer catheter system driving operation input by the user via the outer catheter system operation terminal, sending, by the master console (410), an outer catheter system driving command to the surgical execution apparatus (320), such that the surgical drive device (3230) drives the outer catheter system (201) via the outer catheter system adapter (3221) to perform an action corresponding to the outer catheter system driving operation; and in response to a middle catheter system driving operation input by the user via the middle catheter system operation terminal, sending, by the master console (410), a middle catheter system driving command to the surgical execution apparatus (320), such that the surgical drive device (3230) drives the middle catheter system (202) via the middle catheter system adapter (3222) to perform an action corresponding to the middle catheter system driving operation.

3. The control method according to claim 2, wherein the outer catheter system (201) comprises an outer catheter (2012), an outer catheter system knob (2013) and an outer catheter system handle (2011), the outer catheter (2012) having a proximal end attached to the outer catheter system handle (2011), the outer catheter system knob (2013) being disposed on the outer catheter system handle (2011) and configured to adjust bending of a distal end of the outer catheter (2012);

the outer catheter system adapter (3221) comprises an outer catheter system base (322101), a first outer catheter system transmission assembly (322102) and a second outer catheter system transmission assembly (322103), the first outer catheter system transmission assembly (322102) being disposed on the outer catheter system base (322101) and engaged with the outer catheter system knob (2013), and the second outer catheter system transmission assembly (322103) being disposed on the outer catheter system base (322101) and engaged with the outer catheter system handle (2011);

the surgical drive device (3230) comprises a first outer catheter system driving assembly, a second outer catheter system driving assembly and a third outer catheter system driving assembly, the first outer catheter system driving assembly being connected to the first outer catheter system transmission assembly (322102), the second outer catheter system driving assembly being connected to the second outer catheter system transmission assembly (322103), and the third outer catheter system driving assembly being configured to drive the surgical drive device (3230) to extend or retract;

the outer catheter system operation terminal comprises an outer catheter system operation button and an outer catheter system operation handle; and in response to the outer catheter system driving operation input by the user via the outer catheter system operation terminal, sending, by the master console (410), the outer catheter system driving command to the surgical execution apparatus (320), such that the surgical drive device (3230) drives the outer catheter system (201) via the outer catheter system adapter (3221) to perform an action corresponding to the outer catheter system driving operation comprises:

in response to an outer catheter movement operation input by the user via the outer catheter system operation handle or the outer catheter system operation button, sending, by the master console (410), an outer catheter movement command to the surgical execution apparatus (320), such that the surgical drive device (3230) is driven by the third outer catheter driving assembly to extend or retract to drive the outer catheter system (201) to move, thereby adjusting the outer catheter (2012) to a first target position;

in response to an outer catheter bending operation input by the user via the outer catheter system operation button, sending, by the master console (410), an outer catheter bending command to the surgical execution apparatus (320), such that the outer catheter system knob (2013) is driven by the first outer catheter driving assembly via the first outer catheter system transmission assembly (322102) to rotate, thereby adjusting a bending angle of the distal end of the outer catheter (2012) to a first target bending angle; and in response to an outer catheter rotation operation input by the user via the outer catheter system operation handle, sending, by the master console (410), an outer catheter rotation command to the surgical execution apparatus (320), such that the outer catheter system handle (2011) is driven by the second outer catheter driving assembly via the second outer catheter system transmission assembly (322103) to rotate, thereby adjusting a bending direction of the distal end of the outer catheter (2012) to a first target bending direction.

4. The control method according to claim 2, wherein the middle catheter system (202) comprises a middle catheter (2022), a first middle catheter system knob (2023), a second middle catheter system knob (2024), and a middle catheter system handle (2021), the middle catheter (2022) having a proximal end attached to the middle catheter system handle (2021), the first middle catheter system knob (2023) and the second middle catheter system knob (2024) being disposed on the middle catheter system handle (2021), the first middle catheter system knob (2023) being configured to adjust a bending of a distal end of the middle catheter (2022) in a first direction, and the second middle catheter system knob (2024) being configured to adjust a bending of the distal end of the middle catheter (2022) in a second direction;

the middle catheter system adapter (3222) comprises a middle catheter system base (322201), a first middle catheter system transmission assembly (322202), and a second middle catheter system transmission assembly (322203), the first middle catheter system transmission assembly (322202) being disposed on the middle catheter system base (322201) and engaged with the first middle catheter system knob (2023), and the second middle catheter system transmission assembly (322203) being disposed on the middle catheter system base (322201) and engaged with the second middle catheter system knob (2024);

the surgical drive device (3230) comprises a first middle catheter system driving assembly, a second middle catheter system driving assembly and a third middle catheter system driving assembly, the first middle catheter system driving assembly being connected to the first middle catheter system transmission assembly (322202), the second middle catheter system driving assembly being connected to the second middle catheter system transmission assembly (322203), and the third middle catheter system driving assembly being configured to drive the surgical drive device (3230) to extend or retract;

the middle catheter system operation terminal comprises a first middle catheter system operation button, a second middle catheter system operation button and a middle catheter system operation handle; and in response to the middle catheter system driving operation input by the user via the middle catheter system operation terminal, sending, by the master console (410), the middle catheter system driving command to the surgical execution apparatus (320), such that the surgical drive device (3230) drives the middle catheter system (203) via the middle catheter system adapter (3222) to perform an action corresponding to the middle catheter system driving operation comprises:

in response to a middle catheter movement operation input by the user via the middle catheter operation handle, sending, by the master console (410), a middle catheter movement command to the surgical execution apparatus (320), such that the surgical drive device (3230) is driven by the third middle catheter system driving assembly to extend or retract to drive the middle catheter system (202) to move, thereby adjusting the middle catheter (2022) to a second target position;

in response to a first middle catheter bending operation input by the user via the first middle catheter system operation button, sending, by the master console (410), a first middle catheter bending command to the surgical execution apparatus (320), such that the first middle catheter system knob (2023) is driven by the first middle catheter system driving assembly via the first middle catheter system transmission assembly (322202) to rotate, thereby adjusting a bending angle of the distal end of the middle catheter (2022) in the first direction to a second target bending angle; and in response to a second middle catheter bending operation input by the user via the second middle catheter system operation button, sending, by the master console (410), a second middle catheter bending command to the surgical execution apparatus (320), such that the second middle catheter system knob (2024) is driven by the second middle catheter system driving assembly via the second middle catheter system transmission assembly (322203) to rotate, thereby adjusting a bending angle of the distal end of the middle catheter (2022) in the second direction to a third target bending angle.

5. The control method according to claim 1, wherein the operation terminal comprises a robotic arm operation terminal comprising a first robotic arm operation button and a second robotic arm operation button; and in response to the pose adjustment operation input by the user via the operation terminal, sending, by the master console (410), the pose adjustment command to the robotic arm (310), such that the robotic arm (310) adjusts the pose of the surgical execution apparatus (320) to a pose corresponding to the pose adjustment operation according to the pose adjustment command comprises:

in response to a vertical movement operation input by the user via the second robotic arm operation button, sending, by the master console (410), a vertical movement command to the robotic arm (310), such that the robotic arm (310) controls the surgical execution apparatus (320) to be raised or lowered according to the vertical movement command.

6. The control method according to claim 1, wherein the control device (400) further comprises a slave control touchscreen (323010) disposed on the robotic device (300) and configured to control the robotic device (300), and the control method further comprises:

in response to a pose adjustment operation input by the user via the slave control touchscreen (323010), sending, by the slave control touchscreen (323010), a pose adjustment command to the robotic arm (310), such that the robotic arm (310) adjusts the pose of the surgical execution apparatus (320) to a pose corresponding to the pose adjustment operation according to the pose adjustment command; and in response to a catheter system driving operation input by the user via the slave control touchscreen (323010), sending, by the slave control touchscreen (323010), a catheter system driving command to the surgical execution apparatus (320), such that the surgical drive device drives the catheter system (3210) via the sheath adapter (3220) to perform an action corresponding to the catheter system driving operation.

7. The control method according to claim 1, wherein the control device (400) further comprises a slave robotic arm locking button disposed on the robotic device (300), and the control method further comprises:

in response to a robotic arm operation input by the user via the slave robotic arm locking button, sending, by the control device (400), a robotic arm operation command to the robotic arm (310) to control locking or unlocking of a joint of the robotic arm (310).

8. The control method according to claim 7, wherein the control method further comprises:

in response to a horizontal movement operation input by the user via the slave robotic arm locking button, sending, by the control device (400), a horizontal movement command to the robotic arm (310), such that the robotic arm (310) controls the surgical execution apparatus (320) to move forward or backward according to the horizontal movement command.

9. The control method according to claim 1, wherein the master console (410) further comprises an information display operation button, and the control method further comprises:

in response to an information display operation input by the user via the information display operation button, acquiring, by the master console (410), a status information of the robotic device (300);
splitting a display area of the display screen into a first sub-region and a second sub-region; and
displaying the surgical image in the first sub-region and the status information in the second sub-region.

10. The control method according to claim 1, wherein the control device (400) further comprises an enablement operation switch (420), and the control method further comprises:

in response to an enablement operation input by the user via the enablement operation switch (420), sending, by the control device (400), an enablement command to the robotic device (300), such that the control device (400) establishes a communication connection to the robotic device (300).

11. The control method according to claim 1, wherein the operation terminal further comprises an emergency stop button, and the control method further comprises:

in response to an emergency stop operation input by the user via the emergency stop button, sending, by the master console (410), an emergency stop command to the robotic device (300), such that the robotic device (300) is paused.

12. The control method according to claim 1, wherein the operation terminal further comprises a reset button, and the control method further comprises:

in response to a reset operation input by the user via the reset button, sending, by the master console (410), a reset command to the robotic device (300), such that the robotic device (300) is reset.

13. The control method according to claim 1, wherein the robotic device (300) further comprises a medical cart (330) provided with a robotic arm storage compartment and a robotic arm fixation interface that are adapted for the robotic arm (310), the medical cart (330) being communicatively connected to the control device (400), and the control method further comprises:

in response to a robotic arm transfer operation input by the user via the control device (400), sending, by the control device (400), a robotic arm transfer command to the medical cart (330), such that the medical cart (330) moves to transfer the robotic arm (310) to a fourth target position; and in response to a robotic arm installation operation input by the user via the control device (400), sending, by the control device (400), a robotic arm installation command to the medical cart (330), such that fixation of the robotic arm (310) to the medical cart (330) is released for installation of the robotic arm (310) onto a medical bed (500).

14. A computer-readable storage medium having a computer program stored thereon, wherein the computer program, when executed by a processor, causes a control method for a surgical assistance system according to claim 1 to be implemented.

15. A computer program product, comprising a computer program, wherein the computer program, when executed by a processor, causes a control method for a surgical assistance system according to claim 1 to be implemented.

16. A control apparatus for a surgical assistance system, the surgical assistance system comprising a robotic device (300) and a control device (400);

the robotic device (300) comprises a robotic arm (310) and a surgical execution apparatus (320) disposed at a distal end of the robotic arm (310), the robotic arm (310) being configured to adjust a pose of the surgical execution apparatus (320), the surgical execution apparatus (320) comprising a catheter system (3210), a sheath adapter (3220) and a surgical drive device (3230), the sheath adapter (3220) being connected to the surgical drive device (3230), the sheath adapter (3220) being configured to support the catheter system (3210), and the surgical drive device (3230) being configured to actuate the catheter system (3210) via the sheath adapter (3220);

the control device (400) comprising a master console (410) that comprises an operation terminal and a display screen, the operation terminal being configured to control the robotic device (300), and the display screen being configured to display a surgical image;

wherein the control apparatus comprises:

a first sending unit configured to, in response to a pose adjustment operation input by a user via the operation terminal, cause the master console (410) to send a pose adjustment command to the robotic arm (310), such that the robotic arm (310) adjusts the pose of the surgical execution apparatus (320) to a pose corresponding to the pose adjustment operation according to the pose adjustment command;

a second sending unit configured to, in response to a catheter system driving operation input by the user via the operation terminal, cause the master console (410) to send a catheter system driving command to the surgical execution apparatus (320), such that the surgical drive device (3230) drives the catheter system (3210) via the sheath adapter (3220) to perform an action corresponding to the catheter system driving operation, wherein the catheter system (3210) comprises an inner catheter system (203); the sheath adapter (3220) comprises an inner catheter system adapter (3223), the inner catheter system adapter (3223) being configured to support the inner catheter system (203); and the operation terminal comprises an inner catheter system operation terminal;

the inner catheter system (203) comprises an inner catheter (2032), a first clamping element (204), a second clamping element (205), a clamping element locking rod (2033), a clamping element driving wheel (2034), a first clamping element lever (2035), a second clamping element lever (2036) and an inner catheter system handle (2031), the inner catheter (2032) having a proximal end attached to the inner catheter system handle (2031), the clamping element locking rod (2033) being configured to control unlocking and locking of the first clamping element (204) located at a distal end of the inner catheter (2032), the clamping element driving wheel (2034) being configured to control opening and closing of the first clamping element (204), the first clamping element lever (2035) being configured to control lifting and capturing of a first capture arm of the second clamping element (205) located at the distal end of the inner catheter (2032), and the second clamping element lever (2036) being configured to control lifting and capturing of a second capture arm of the second clamping element (205);

the inner catheter system adapter (3223) comprises an inner catheter system base (322301), an inner catheter rotation transmission assembly (322302), a clamping element locking rod transmission assembly (322303), a clamping element driving wheel transmission assembly (322304), a first clamping element lever transmission assembly (322305) and a second clamping element lever transmission assembly (322306), the inner catheter rotation transmission assembly (322302) being disposed on the inner catheter system base (322301) and engaged with the inner catheter system handle (2031), the clamping element locking rod transmission assembly (322303) being disposed on the inner catheter system base (322301) and engaged with the clamping element locking rod (2033), the clamping element driving wheel transmission assembly (322304) being disposed on the inner catheter system base (322301) and engaged with the clamping element driving wheel (2034), the first clamping element lever transmission assembly (322305) being disposed on the inner catheter system base (322301) and engaged with the second clamping element lever (2035), and the second clamping element lever transmission assembly (322306) being disposed on the inner catheter system base (322301) and engaged with the second clamping element lever (2036);

the surgical drive device comprises an inner catheter movement driving assembly, an inner catheter rotation driving assembly, a clamping element locking rod driving assembly, a clamping element driving wheel driving assembly, a first clamping element lever driving assembly and a second clamping element lever driving assembly, the inner catheter movement driving assembly being configured to drive the surgical drive device (3230) to extend or retract, the inner catheter rotation driving assembly being connected to the inner catheter rotation transmission assembly (322302), the clamping element locking rod driving assembly being connected to the clamping element locking rod transmission assembly (322303), the clamping element driving wheel driving assembly being connected to the clamping element driving wheel transmission assembly (322304), the first clamping element lever driving assembly being connected to the first clamping element lever transmission assembly (322305), and the second clamping element lever driving assembly being connected to the second clamping element lever transmission assembly (322306);

the inner catheter system operation terminal comprises a clamping element locking rod operation button, a clamping element driving wheel operation button, a first clamping element lever operation button, a second clamping element lever operation button and an inner catheter system operation handle; and the second sending unit (3502) is configured to:

in response to an inner catheter movement operation input by the user via the inner catheter system operation handle, cause the master console (410) to send an inner catheter movement command to the surgical execution apparatus (320), such that the surgical drive device (3230) is driven by the inner catheter movement driving assembly to extend or retract to drive the inner catheter system (203) to move, thereby adjusting the inner catheter (2032) to a third target position;

in response to an inner catheter rotation operation input by the user via the inner catheter system operation handle, cause the master console (410) to send an inner catheter rotation command to the surgical execution apparatus (320), such that the inner catheter system handle (2031) is driven by the inner catheter rotation driving assembly via the inner catheter rotation transmission assembly (322302) to rotate, thereby adjusting a bending direction of the distal end of the inner catheter (2032) to a second target bending direction;

in response to a clamping element locking rod operation input by the user via the clamping element locking rod (2033) operation button, cause the master console (410) to send a clamping element locking rod operation command to the surgical execution apparatus (320), such that the clamping element locking rod (2033) is driven by the clamping element locking rod driving assembly via the clamping element locking rod transmission assembly (322303) to move, thereby controlling the first clamping element (204) to be locked or unlocked;

in response to a clamping element driving wheel operation input by the user via the clamping element driving wheel operation button, cause the master console (410) to send a clamping element driving wheel operation command to the surgical execution apparatus (320), such that the clamping element driving wheel (2034) is driven by the clamping element driving wheel driving assembly via the clamping element driving wheel transmission assembly (322304) to rotate, thereby controlling the first clamping element (204) to be opened or closed;

in response to a first clamping element lever operation input by the user via the first clamping element lever operation button, cause the master console (410) to send a first clamping element lever operation command to the surgical execution apparatus (320), such that the first clamping element lever (2035) is driven by the first clamping element lever driving assembly via the first clamping element lever transmission assembly (322305) to move, thereby controlling capturing or lifting of the first capture arm of the second clamping element (205);

in response to a second clamping element lever operation input by the user via the second clamping element lever operation button, cause the master console (410) to send a second clamping element lever operation command to the surgical execution apparatus (320), such that the second clamping element lever (2036) is driven by the second clamping element lever driving assembly via the second clamping element lever transmission assembly (322306) to move, thereby controlling capturing or lifting of the second capture arm of the second clamping element (205); and in response to a clamping element lever operation input by the user via the first clamping element lever operation button, or in response to a clamping element lever operation input by the user via the second clamping element lever operation button, cause the master console (410) to send a command to the surgical execution apparatus (320), such that the first clamping element lever (2035) and the second clamping element lever (2036) are driven by the first clamping element lever driving assembly and the second clamping element lever driving assembly via the first clamping element lever transmission assembly (322305) and the second clamping element lever transmission assembly (322306) to move respectively, thereby controlling simultaneous capturing or lifting of the first capture arm and the second capture arm of the second clamping element (205).

17. The control apparatus according to claim 16, wherein the catheter system (3210) further comprises an outer catheter system (201) and a middle catheter system (202) and an inner catheter system (203); the sheath adapter (3220) further comprises an outer catheter system adapter (3221) and a middle catheter system adapter (3222), the outer catheter system adapter (3221) being configured to support the outer catheter system (201), and the middle catheter system adapter (3222) being configured to support the middle catheter system (202); and the operation terminal comprises an outer catheter system operation terminal and a middle catheter system operation terminal; and the second sending unit (3502) is configured to:

in response to an outer catheter system driving operation input by the user via the outer catheter system operation terminal, cause the master console (410) to send an outer catheter system driving command to the surgical execution apparatus (320), such that the surgical drive device (3230) drives the outer catheter system (201) via the outer catheter system adapter 3221 to perform an action corresponding to the outer catheter system driving operation; and in response to a middle catheter system driving operation input by the user via the middle catheter system operation terminal, cause the master console (410) to send a middle catheter system driving command to the surgical execution apparatus (320), such that the surgical drive device (3230) drives the middle catheter system (202) via the middle catheter system adapter (3222) to perform an action corresponding to the middle catheter system driving operation.

18. The control apparatus according to claim 17, wherein the outer catheter system (201) comprises an outer catheter (2012), an outer catheter system knob (2013) and an outer catheter system handle (2011), the outer catheter (2012) having a proximal end attached to the outer catheter system handle (2011), the outer catheter system knob (2013) being disposed on the outer catheter system handle (2011) and configured to adjust bending of a distal end of the outer catheter (2012);

the outer catheter system adapter (3221) comprises an outer catheter system base (322101), a first outer catheter system transmission assembly (322102) and a second outer catheter system transmission assembly (322103), the first outer catheter system transmission assembly (322102) being disposed on the outer catheter system base (322101) and engaged with the outer catheter system knob (2013), and the second outer catheter system transmission assembly (322103) being disposed on the outer catheter system base (322101) and engaged with the outer catheter system handle (2011);

the surgical drive device (3230) comprises a first outer catheter system driving assembly, a second outer catheter system driving assembly and a third outer catheter system driving assembly, the first outer catheter system driving assembly being connected to the first outer catheter system transmission assembly (322102), the second outer catheter system driving assembly being connected to the second outer catheter system transmission assembly (322103), and the third outer catheter system driving assembly being configured to drive the surgical drive device (3230) to extend or retract;

the outer catheter system operation terminal comprises an outer catheter system operation button and an outer catheter system operation handle; and the second sending unit (3502) is configured to:

in response to an outer catheter movement operation input by the user via the outer catheter system operation handle or the outer catheter system operation button, cause the master console (410) to send an outer catheter movement command to the surgical execution apparatus (320), such that the surgical drive device (3230) is driven by the third outer catheter driving assembly to extend or retract to drive the outer catheter system (201) to move, thereby adjusting the outer catheter (2012) to a first target position;

in response to an outer catheter bending operation input by the user via the outer catheter system operation button, cause the master console (410) to send an outer catheter bending command to the surgical execution apparatus (320), such that the outer catheter system knob (2013) is driven by the first outer catheter driving assembly via the first outer catheter system transmission assembly (322102) to rotate, thereby adjusting a bending angle of the distal end of the outer catheter (2012) to a first target bending angle; and in response to an outer catheter rotation operation input by the user via the outer catheter system operation handle, cause the master console (410) to send an outer catheter rotation command to the surgical execution apparatus (320), such that the outer catheter system handle (2011) is driven by the second outer catheter driving assembly via the second outer catheter system transmission assembly (322103) to rotate, thereby adjusting a bending direction of the distal end of the outer catheter (2012) to a first target bending direction.

19. The control apparatus according to claim 17, wherein the middle catheter system (202) comprises a middle catheter (2022), a first middle catheter system knob (2023), a second middle catheter system knob (2024), and a middle catheter system handle (2021), the middle catheter (2022) having a proximal end attached to the middle catheter system handle (2021), the first middle catheter system knob (2023) and the second middle catheter system knob (2024) being disposed on the middle catheter system handle (2021), the first middle catheter system knob (2023) being configured to adjust a bending of a distal end of the middle catheter (2022) in a first direction, and the second middle catheter system knob (2024) being configured to adjust a bending of the distal end of the middle catheter (2022) in a second direction;

the middle catheter system adapter (3222) comprises a middle catheter system base (322201), a first middle catheter system transmission assembly (322202), and a second middle catheter system transmission assembly (322203), the first middle catheter system transmission assembly (322202) being disposed on the middle catheter system base (322201) and engaged with the first middle catheter system knob (2023), and the second middle catheter system transmission assembly (322203) being disposed on the middle catheter system base (322201) and engaged with the second middle catheter system knob (2024);

the surgical drive device (3230) comprises a first middle catheter system driving assembly, a second middle catheter system driving assembly and a third middle catheter system driving assembly, the first middle catheter system driving assembly being connected to the first middle catheter system transmission assembly (322202), the second middle catheter system driving assembly being connected to the second middle catheter system transmission assembly (322203), and the third middle catheter system driving assembly being configured to drive the surgical drive device (3230) to extend or retract;

the middle catheter system operation terminal comprises a first middle catheter system operation button, a second middle catheter system operation button and a middle catheter system operation handle; and the second sending unit (3502) is configured to:

in response to a middle catheter movement operation input by the user via the middle catheter operation handle, cause the master console (410) to send a middle catheter movement command to the surgical execution apparatus (320), such that the surgical drive device (3230) is driven by the third middle catheter system driving assembly to extend or retract to drive the middle catheter system (202) to move, thereby adjusting the middle catheter (2022) to a second target position;

in response to a first middle catheter bending operation input by the user via the first middle catheter system operation button, cause the master console (410) to send a first middle catheter bending command to the surgical execution apparatus (320), such that the first middle catheter system knob (2023) is driven by the first middle catheter system driving assembly via the first middle catheter system transmission assembly (322202) to rotate, thereby adjusting a bending angle of the distal end of the middle catheter (2022) in the first direction to a second target bending angle; and in response to a second middle catheter bending operation input by the user via the second middle catheter system operation button, cause the master console (410) to send a second middle catheter bending command to the surgical execution apparatus (320), such that the second middle catheter system knob (2024) is driven by the second middle catheter system driving assembly via the second middle catheter system transmission assembly (322203) to rotate, thereby adjusting a bending angle of the distal end of the middle catheter (2022) in the second direction to a third target bending angle.

* * * * *